United States Patent
Kato et al.

(10) Patent No.: US 10,050,317 B2
(45) Date of Patent: Aug. 14, 2018

(54) HEAT INSULATING MEMBER AND BATTERY COVER

(71) Applicant: NITTO DENKO CORPORATION, Ibaraki-shi, Osaka (JP)

(72) Inventors: Masakazu Kato, Osaka (JP); Masanori Uesugi, Osaka (JP); Junki Miyoshi, Osaka (JP); Masashi Nishino, Osaka (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 0 days.

(21) Appl. No.: 15/517,303

(22) PCT Filed: Oct. 22, 2015

(86) PCT No.: PCT/JP2015/079847
§ 371 (c)(1),
(2) Date: Apr. 6, 2017

(87) PCT Pub. No.: WO2016/063955
PCT Pub. Date: Apr. 28, 2016

(65) Prior Publication Data
US 2017/0301965 A1     Oct. 19, 2017

(30) Foreign Application Priority Data

Oct. 23, 2014   (JP) ................... 2014-216627

(51) Int. Cl.
*H01M 10/613*   (2014.01)
*F16L 59/02*   (2006.01)
(Continued)

(52) U.S. Cl.
CPC .......... *H01M 10/613* (2015.04); *F16L 59/02* (2013.01); *H01M 2/02* (2013.01); *H01M 2/10* (2013.01);
(Continued)

(58) Field of Classification Search
CPC ..................... H01M 10/613; H01M 10/625
See application file for complete search history.

(56) References Cited

U.S. PATENT DOCUMENTS

| | | |
|---|---|---|
| 4,430,286 A | 2/1984 | Franz |
| 5,626,982 A | 5/1997 | Kawai et al. |
| (Continued) | | |

FOREIGN PATENT DOCUMENTS

| | | |
|---|---|---|
| JP | 58-201634 A | 11/1983 |
| JP | 04-331644 A | 11/1992 |
| (Continued) | | |

OTHER PUBLICATIONS

International Search Report of PCT/JP2015/079847 dated Dec. 28, 2015 [PCT/ISA/210] English Translation.
(Continued)

*Primary Examiner* — Olatunji Godo
(74) *Attorney, Agent, or Firm* — Sughrue Mion, PLLC

(57) ABSTRACT

A heat insulating member includes a wall member. The wall member includes a high-density portion provided at one end edge in a direction orthogonal to a thickness direction of the wall member and having density of above 0.45 g/cm³ and a low-density portion provided midway in the direction orthogonal to the thickness direction, having heat-insulating properties, and having density of 0.45 g/cm³ or less. The high-density portion is provided over the entire one end edge and the thickness of the high-density portion is thinner than that of the low-density portion.

8 Claims, 12 Drawing Sheets

(51) Int. Cl.
   *H01M 2/02*      (2006.01)
   *H01M 2/10*      (2006.01)
   *H01M 10/625*    (2014.01)
   *H01M 10/647*    (2014.01)
   *H01M 10/651*    (2014.01)
   *H01M 10/658*    (2014.01)
   *B60R 16/04*     (2006.01)
   *B60R 13/08*     (2006.01)

(52) U.S. Cl.
   CPC ....... *H01M 10/625* (2015.04); *H01M 10/647* (2015.04); *H01M 10/651* (2015.04); *H01M 10/658* (2015.04); *B60R 13/0869* (2013.01); *B60R 16/04* (2013.01); *H01M 2220/20* (2013.01)

(56) References Cited

U.S. PATENT DOCUMENTS

| | | |
|---|---|---|
| 2016/0072105 A1 | 3/2016 | Muto et al. |
| 2016/0099442 A1 | 4/2016 | Kanayama |

FOREIGN PATENT DOCUMENTS

| | | |
|---|---|---|
| JP | 07-37567 A | 2/1995 |
| JP | 2013-238305 A | 11/2013 |
| WO | 2014/175259 A1 | 10/2014 |
| WO | 2014/192723 A1 | 12/2014 |

OTHER PUBLICATIONS

Extended European Search Report dated Jan. 29, 2018, from European Patent Office in counterpart application No. 15852332.4.

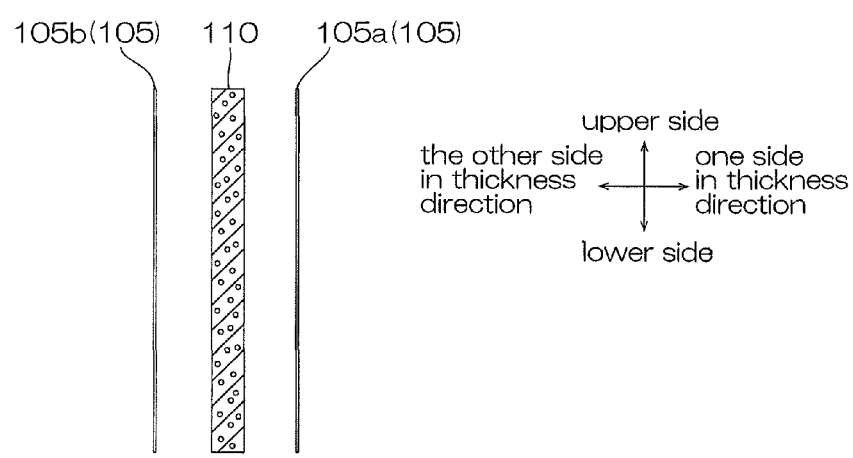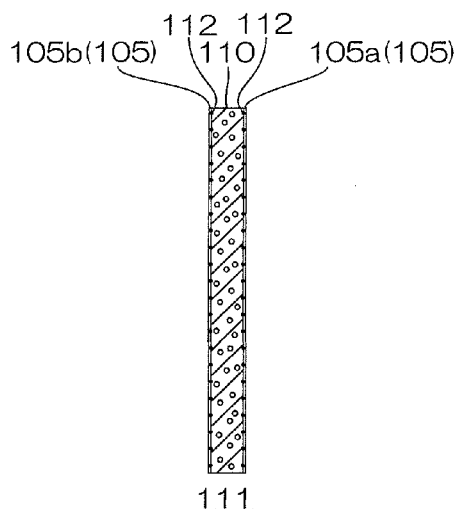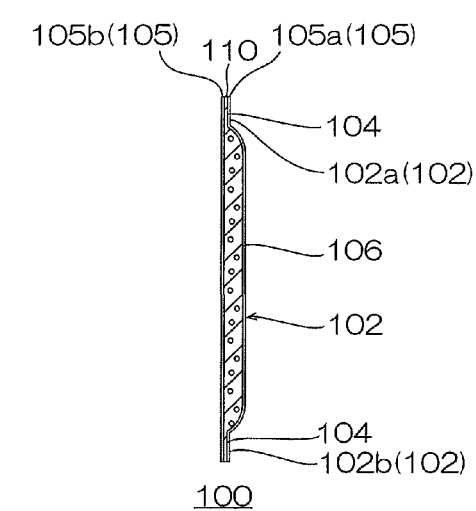

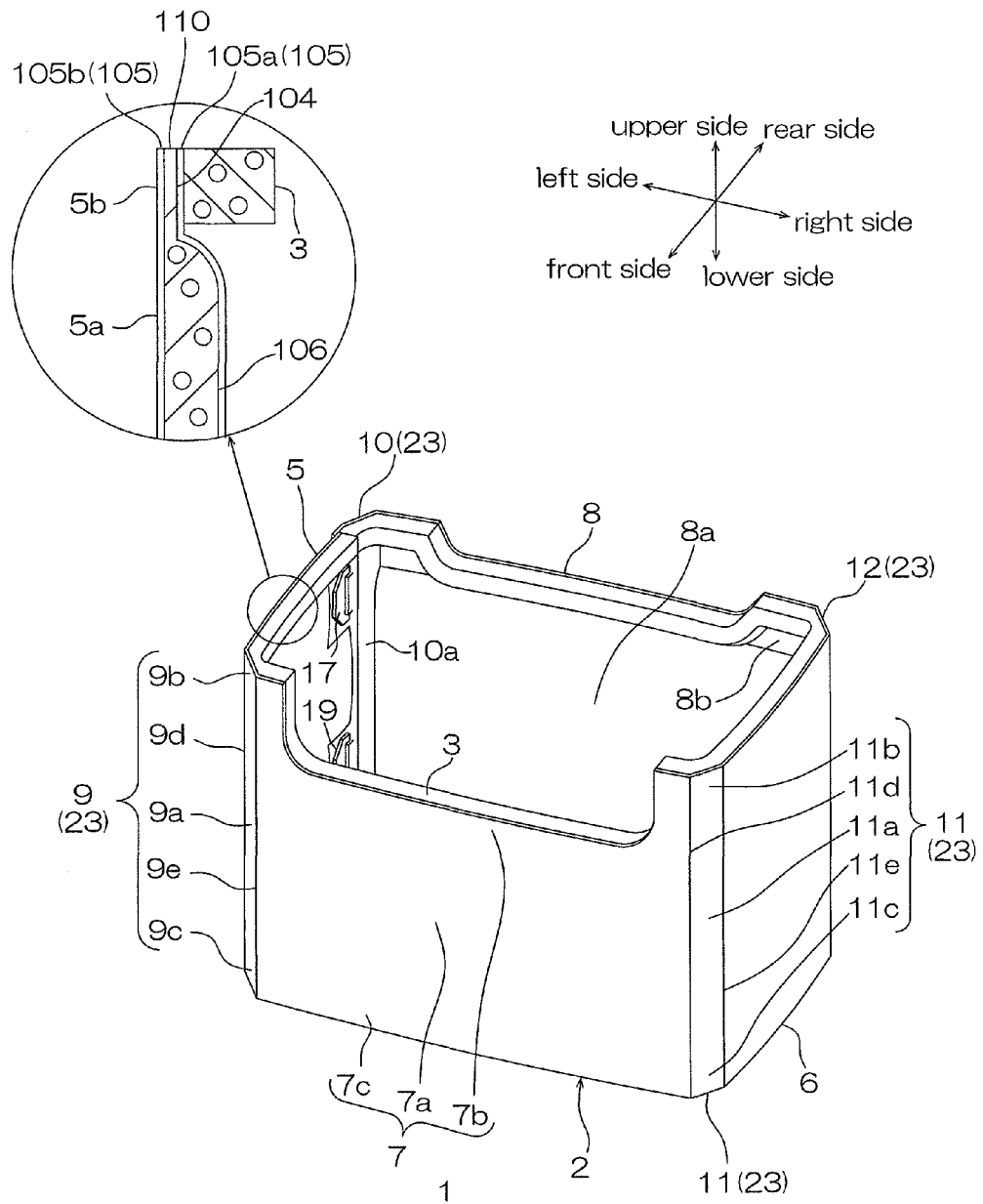

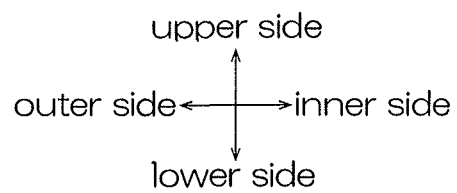
FIG.5A
FIG.5B
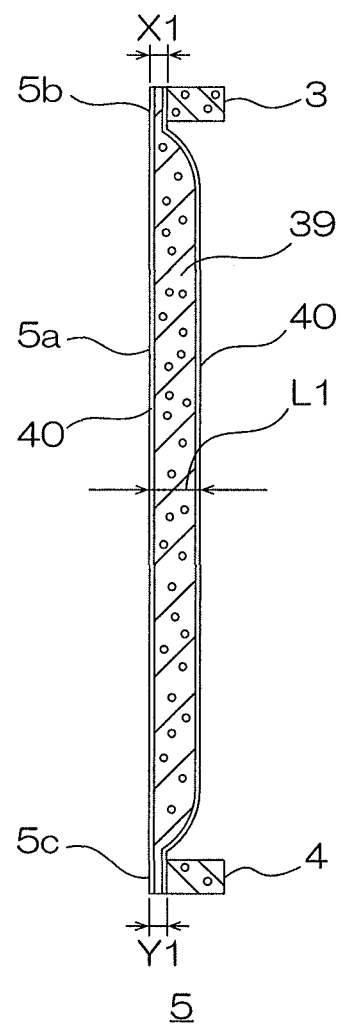
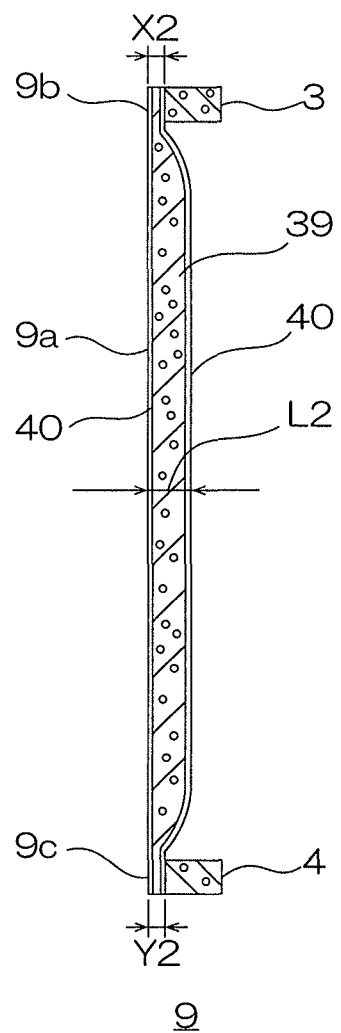

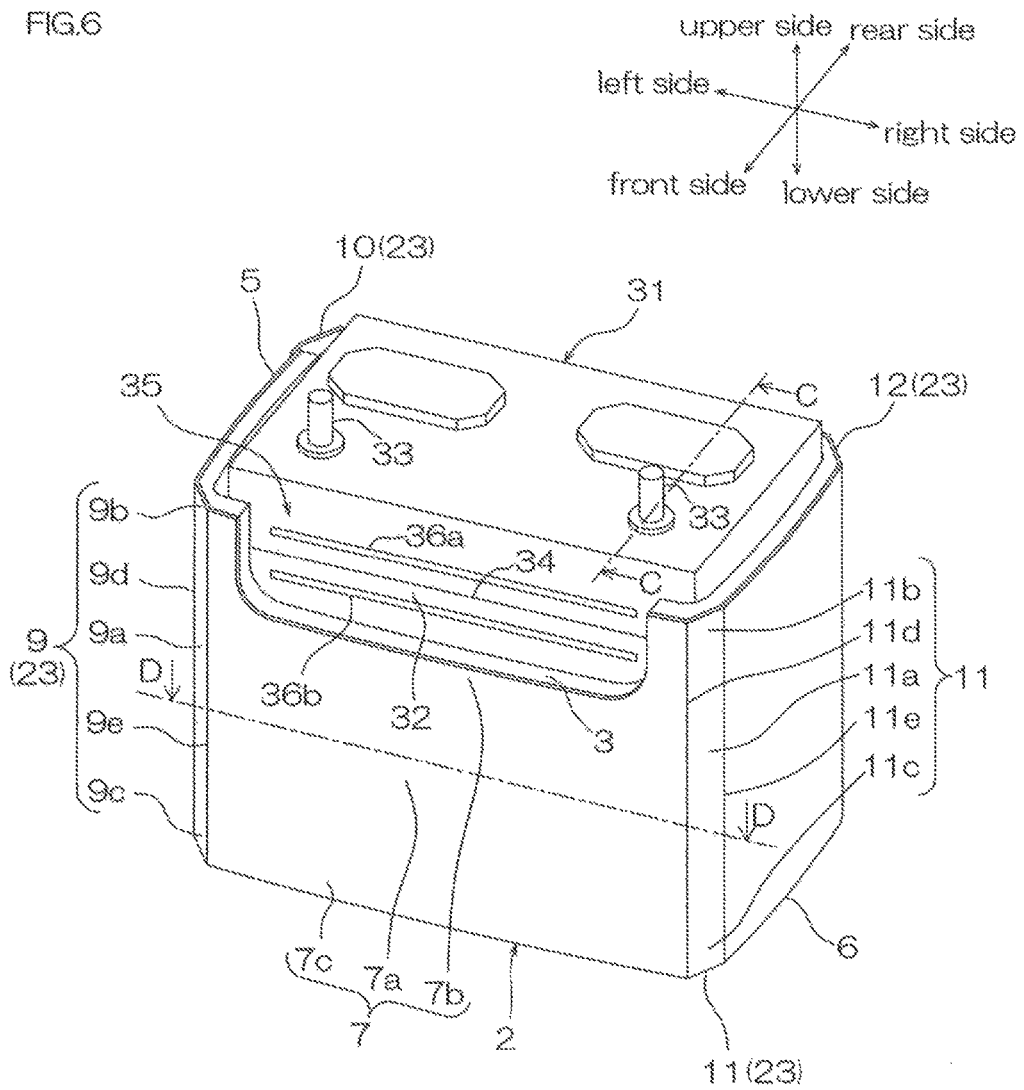

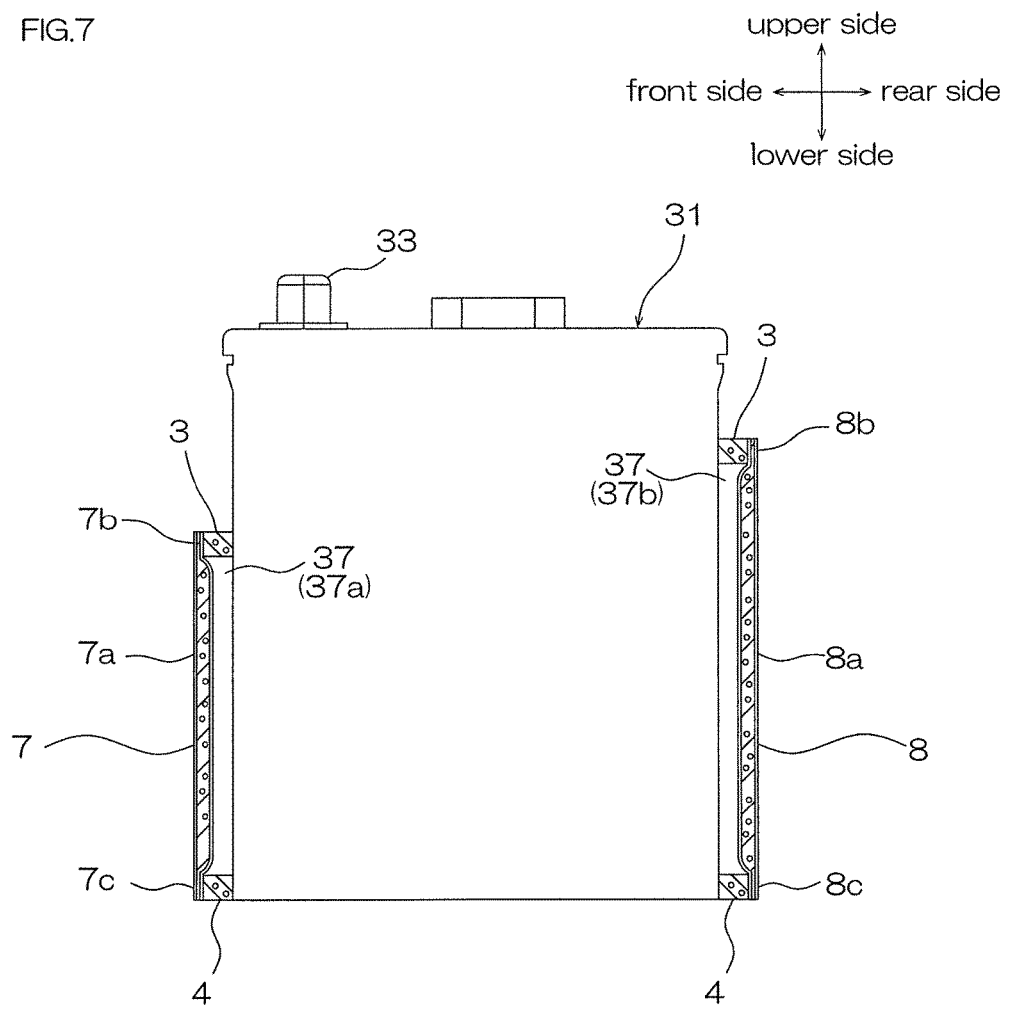

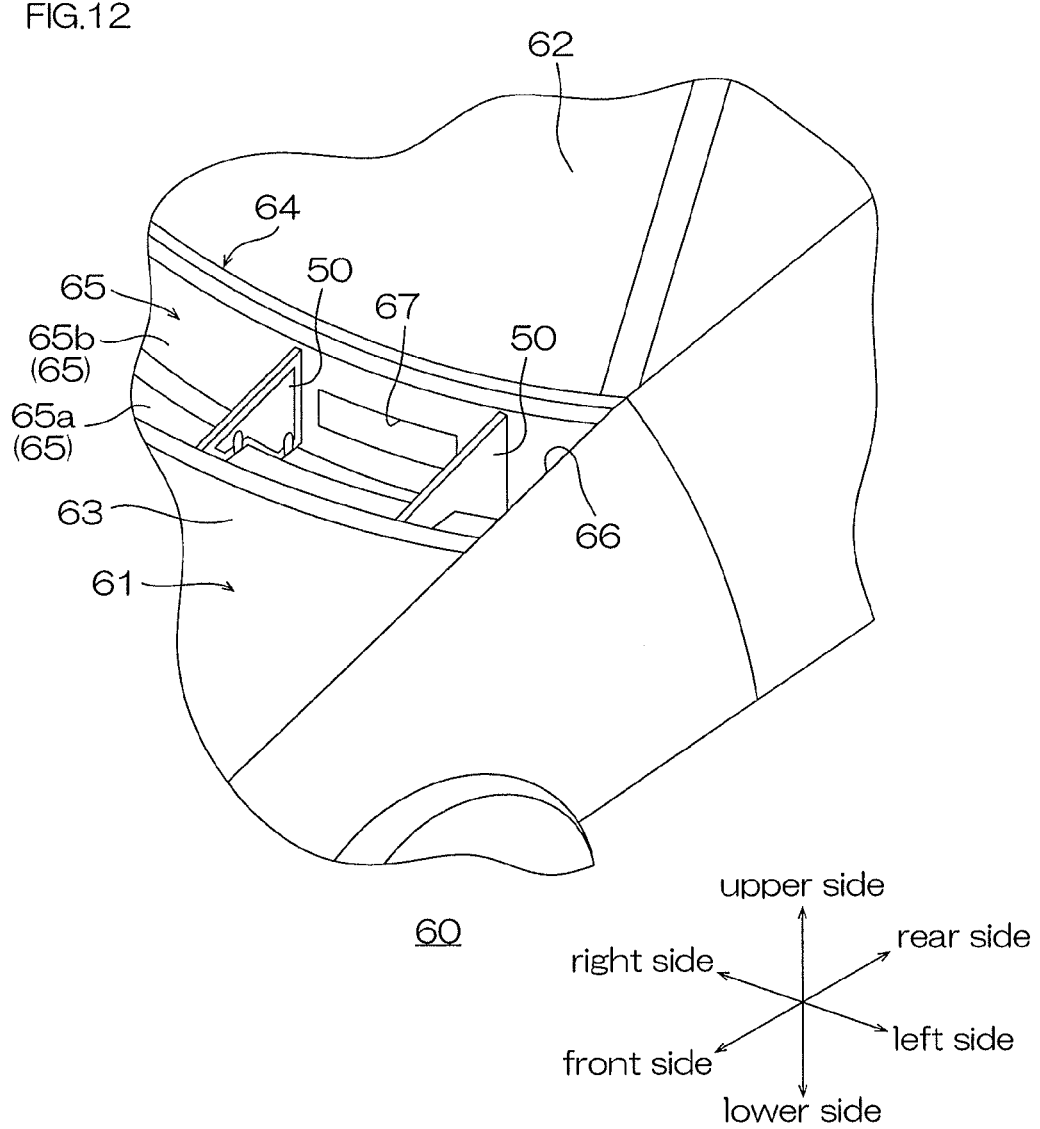

HEAT INSULATING MEMBER AND BATTERY COVER

CROSS REFERENCE TO RELATED APPLICATIONS

This application is a National Stage of International Application No. PCT/JP2015/079847, filed Oct. 22, 2015, claiming priority based on Japanese Patent Application No. 2014-216627, filed Oct. 23, 2014, the contents of all of which are incorporated herein by reference in their entirety.

TECHNICAL FIELD

The present invention relates to a heat insulating member and a battery cover. In particular, the present invention relates to a heat insulating member used in vehicles and a battery cover used to protect a battery from heat.

BACKGROUND ART

Vehicle batteries are generally placed in an engine room along with the engine. In vehicle batteries, heat from, for example, the engine heats the battery surface to increase the temperature of the battery fluid inside the battery. As a result, the battery's life is shortened.

Thus, to protect the battery from heat, Patent Document 1 has proposed a battery cover to cover the side faces of the battery.

Patent Document 1 has disclosed a heat insulating device of a battery obtained by attaching a pad member made of a foam article having a predetermined shape to an outer side face of a battery case and covering the outer side face with the pad member.

CITATION LIST

Patent Document

Patent Document 1
Japanese Unexamined Patent Publication No. 1995-37567

SUMMARY OF THE INVENTION

Problem to be Solved by the Invention

The battery cover described in Patent Document 1, however, is a pad member made of a foam article. Thus, the mechanical strength of the upper end portion or the lower end portion of the battery cover is weak, and it is disadvantageous in that when the battery cover is attached to or detached from the battery, an end portion thereof is deformed.

In the engine room, while the temperature is increased by heat generation of the engine, the cold air from outside enters, so that a difference in temperature easily occurs, causing water drops. Then, it is disadvantageous in that the generated water enters the inside of the pad member from the end portion thereof, causing corrosion and a reduction in heat-insulating properties of the pad member.

An object of the present invention is to provide a heat insulating member and a battery cover having excellent mechanical strength, water resistance, and heat-insulating properties.

Means for Solving the Problem

The present invention [1] includes a heat insulating member including a wall member, wherein the wall member includes a high-density portion provided at one end edge in a direction orthogonal to a thickness direction of the wall member and having density of above 0.45 g/cm$^3$ and a low-density portion provided midway in the direction orthogonal to the thickness direction, having heat-insulating properties, and having density of 0.45 g/cm$^3$ or less, and the high-density portion is provided over the entire one end edge and the thickness of the high-density portion is thinner than that of the low-density portion.

According to the heat insulating member, the high-density portion is provided over the entire one end edge and the low-density portion is not disposed at the one end edge. Thus, the mechanical strength of the one end edge can be improved. Therefore, the durability is excellent.

Also, the high-density portion is provided over the entire one end edge and the thickness of the high-density portion is formed thin. Thus, the entry of water from the one end edge can be suppressed, so that the water resistance can be improved. Therefore, corrosion and a reduction in heat-insulating properties of the heat insulating member can be suppressed.

The low-density portion has density of 0.45 g/cm$^3$ or less, so that it has excellent heat-insulating properties.

The present invention [2] includes the heat insulating member described in [1], wherein the high-density portion includes a compressed portion and an air barrier layer provided on at least one side face in a thickness direction of the compressed portion and the low-density portion includes a foam portion and an air barrier layer provided on at least one side face in a thickness direction of the foam portion.

According to the heat insulating member, the barrier properties of the air are improved, so that the heat-insulating properties of the heat insulating member can be further more improved.

The present invention [3] includes the heat insulating member described in [2], wherein the air barrier layer is a resin-impregnated nonwoven fabric including a nonwoven fabric and a resin impregnated into the nonwoven fabric.

According to the heat insulating member, the water resistance, chemical resistance, and moldability of the heat insulating member can be improved.

The present invention [4] includes the heat insulating member described in [3], wherein the compressed portion is impregnated with the resin.

According to the heat insulating member, the compressed portion is also impregnated with the resin that is impregnated into the nonwoven fabric of the air barrier layer, so that the tight contact and integration of the compressed portion with the air barrier layer can be achieved. As a result, the mechanical strength and water resistance of the high-density portion can be further more improved.

The present invention [5] includes the heat insulating member described in any one of [2] to [4], wherein an adhesive is provided between the compressed portion and the foam portion, and the air barrier layer.

According to the heat insulating member, the air barrier layer strongly adheres to the high-density portion and the low-density portion, so that the heat-insulating properties of the heat insulating member can be more reliably improved.

The present invention [6] includes the heat insulating member described in any one of [2] to [5], wherein the compressed portion is a compressed body obtained by compressing foam and the foam portion is the foam.

According to the heat insulating member, the compressed portion and the foam portion can be formed from one piece of foam sheet, so that the moldability is excellent. Also, the compressed portion and the foam portion are integrally formed, so that the mechanical strength of the wall member is excellent.

The present invention [7] includes a battery cover including side walls covering four side faces of a battery, wherein at least one side wall is the above-described wall member.

According to the battery cover, the high-density portion is provided over the entire one end edge and the low-density portion is not disposed at the one end edge. Thus, the mechanical strength of the one end edge can be improved.

Also, the high-density portion is provided over the entire one end edge and the thickness of the high-density portion is formed thin. Thus, the entry of water from the one end edge can be suppressed, so that the water resistance can be improved. Therefore, corrosion and a reduction in heat-insulating properties of the heat insulating member can be suppressed.

The side wall has density of 0.45 $g/cm^3$ or less, so that it has excellent heat-insulating properties.

The present invention [8] includes the battery cover described in [7] further including a spacer provided at the high-density portion for providing a space between the battery and the side walls.

This battery cover allows for generation of a space (air layer) between the side faces of the battery and the battery cover. Therefore, the heat conducted from outside to the side walls of the battery cover is not conducted directly to the battery side faces through the battery cover. Therefore, the battery cover has further more excellent heat-insulating properties, and effectively protects the battery from outside heat.

Effect of the Invention

The heat insulating member and the battery cover of the present invention achieve the improvement of mechanical strength, water resistance, and heat-insulating properties. Therefore, the heat insulating member and the battery cover of the present invention can retain excellent heat-insulating properties over a long period of time.

BRIEF DESCRIPTION OF THE DRAWINGS

FIG. 1A showing a plan view and
FIG. 1B showing a cross-sectional view.
FIGS. 2A to 2C show process drawings for illustrating a method for producing the heat insulating member shown in FIG. 1:
FIG. 2A showing a step of preparing a foam sheet and an air barrier layer,
FIG. 2B showing a step of laminating the foam sheet and the air barrier layer, and
FIG. 2C showing a step of thermocompressing a laminate.
FIG. 3 shows a perspective view of one embodiment of a battery cover of the present invention.
FIGS. 5A and 5B are cross-sectional views of FIG. 4:
FIG. 5A showing a cross-sectional view taken along A-A and
FIG. 5B showing a cross-sectional view taken along B-B.
FIG. 6 shows a perspective view of the battery cover shown in FIG. 3 attached to a battery.
FIG. 7 shows a side sectional view taken along C-C in FIG. 6.
FIG. 9A showing a side view and
FIG. 9B showing a plan view.
FIG. 10A showing a side view and
FIG. 10B showing a plan view.
FIG. 11A showing a plan view and
FIG. 11B showing a cross-sectional view taken along E-E.
FIG. 12 shows a perspective view of a vehicle including the shielding member shown in FIG. 11.

DESCRIPTION OF EMBODIMENTS 1-1. Heat Insulating Member

Figure 1A:
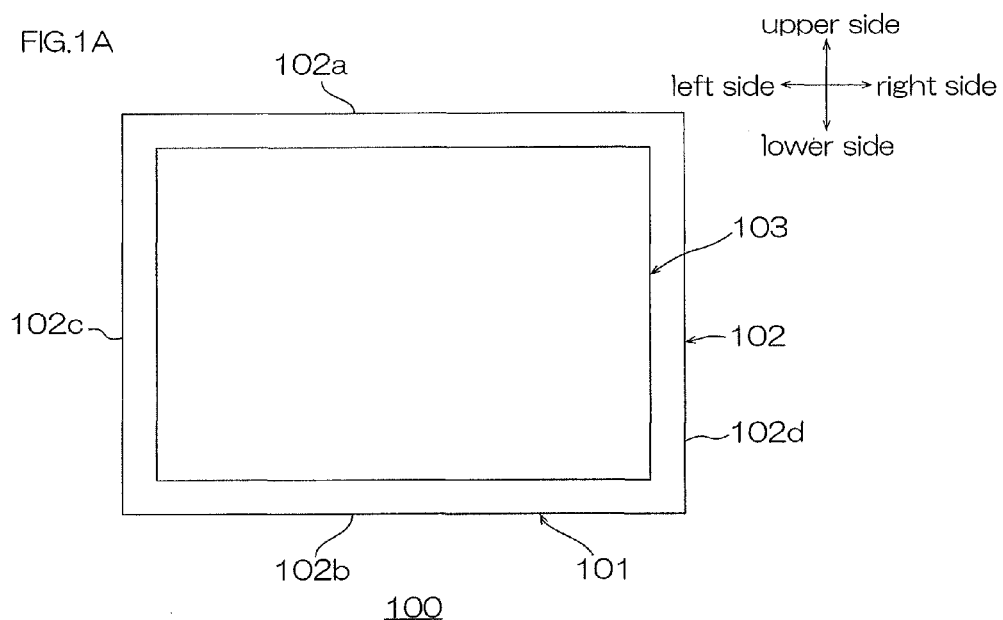
FIGS. 1A and 1B show one embodiment of a heat insulating member of the present invention.

The directions in FIG. 1A are as follows: upper side on the plane of the sheet is upper side (one side in a first direction), lower side on the plane of the sheet is lower side (the other side in the first direction), left side on the plane of the sheet is left side (one side in a second direction), right side on the plane of the sheet is right side (the other side in the second direction), front side on the plane of the sheet is one side in a thickness direction (one side in a third direction), and far side on the plane of the sheet is the other side in the thickness direction (the other side in the third direction). The directions in FIGS. 1B and 2A to 2B are also in conformity with the directions in FIG. 1A.

Figure 1B:
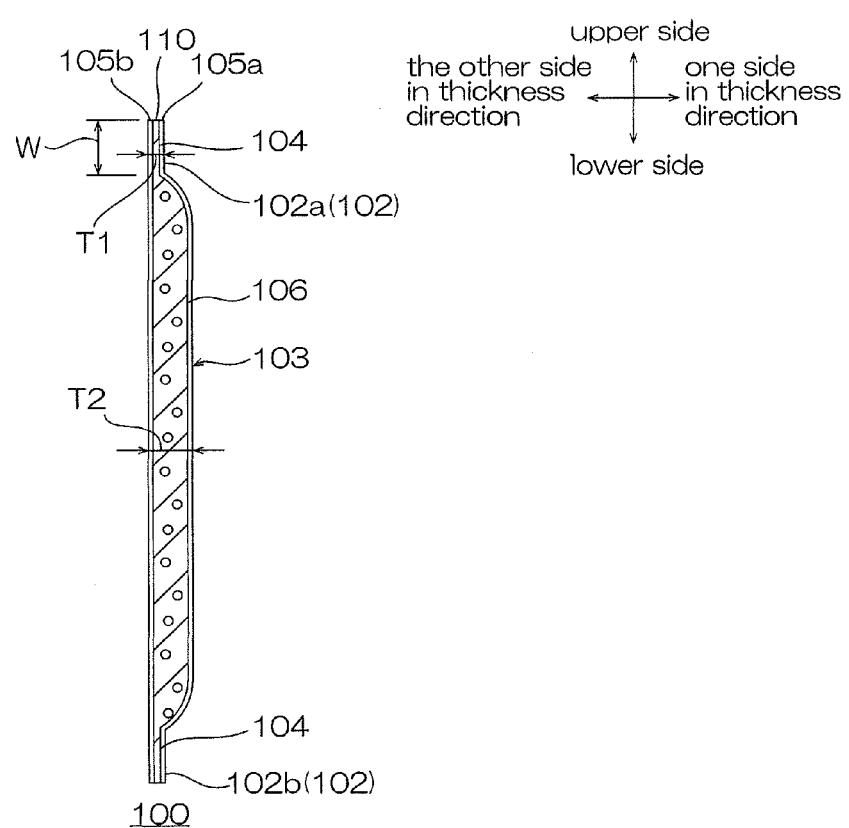

As shown in FIGS. 1A and 1B, a heat insulating member 100 as a heat insulating member of the present invention includes a wall member 101 and preferably consists of the wall member 101.

As shown in FIG. 1A, the wall member 101 is, for example, formed into a generally rectangular flat plate shape.

The wall member 101 includes a high-density portion 102 provided at the circumferential end edge of the wall member 101 and a low-density portion 103 provided at the inner side of the high-density portion 102.

The high-density portion 102 is formed over the entire circumferential end edge of the wall member 101. That is, the high-density portion 102 is provided in a generally rectangular frame shape so as to go around the circumferential end edge of the wall member 101. To be specific, the high-density portion 102 includes an upper-end high-density portion 102a continuously formed from the left end edge over the right end edge at the upper end edge (one end edge) of the wall member 101, a lower-end high-density portion 102b continuously formed from the left end edge over the right end edge at the lower end edge (the other end edge) of the wall member 101, a left-end high-density portion 102c continuously formed from the upper end edge over the lower end edge at the left end edge of the wall member 101, and a right-end high-density portion 102d continuously formed from the upper end edge over the lower end edge at the right end edge of the wall member 101.

As described later, the high-density portion 102 includes a compressed portion 104, a first air barrier layer 105a provided on one face (one side face in the thickness direction) of the compressed portion 104, and a second air barrier layer 105b provided on the other face (the other side face in the thickness direction) of the compressed portion 104. That is, in the high-density portion 102, both faces of the compressed portion 104 are sandwiched between two air barrier layers 105 (105a and 105b) so as to be in contact with the first air barrier layer 105a and the second air barrier layer 105b. Also, as described later, the compressed portion 104 includes a resin (not shown) impregnated into the compressed portion 104.

The thickness of the high-density portion 102 is formed thinner than that of the low-density portion 103.

The low-density portion 103 has heat-insulating properties and is formed into a generally rectangular shape at a generally central portion of the wall member 101 other than the circumferential end edge thereof. That is, the low-density portion 103 is provided midway from the upper end edge to the lower end edge of the wall member 101 and midway from the left end edge to the right end edge thereof. The circumferential end edge of the low-density portion 103 is continuous to the inner circumferential edge of the high-density portion 102 over the entire edge thereof. That is, the low-density portion 103 is provided so as not to be positioned at the circumferential end edge of the wall member 101.

As shown in FIG. 1B, in the thickness direction, the low-density portion 103 is provided so that the other end portion in the thickness direction of the low-density portion 103 coincides with the other end portion in the thickness direction of the high-density portion 102, and one end portion in the thickness direction of the low-density portion 103 is positioned at one side in the thickness direction with respect to one end portion in the thickness direction of the high-density portion 102. That is, the low-density portion 103 bulges toward the one side in the thickness direction with respect to the high-density portion 102.

As described later, the low-density portion 103 includes a foam portion 106, the first air barrier layer 105a provided on one face of the foam portion 106, and the second air barrier layer 105b provided on the other face of the foam portion 106. That is, in the low-density portion 103, both faces of the foam portion 106 are sandwiched between the two air barrier layers 105 (105a and 105b) so as to be in contact with the first air barrier layer 105a and the second air barrier layer 105b.

1-2. Heat Insulating Member Production Method

Next, a method for producing the heat insulating member 100 is described with reference to FIGS. 2A to 2C.

First, as shown in FIG. 2A, a foam sheet 110 as foam and the two air barrier layers 105 (105a and 105b) are prepared, and the foam sheet 110 is disposed between the two air barrier layers 105.

In the foam sheet 110, the foam is formed into a sheet. Examples of the foam include polyurethane foam, polystyrene foam, polyolefin foam, chloroprene foam, and polyester foam. Use of the foam allows the heat insulating member 100 to have excellent heat-insulating properties. Of these examples of the foam, preferably, polyurethane foam is used in view of moldability and heat-insulating properties.

The foam sheet 110 has an open-cell ratio of, for example, 50% or more, preferably 60% or more, and for example, 100% or less.

The foam sheet 110 (before compression) has a thickness of, for example, 1 mm or more, preferably 5 mm or more, and for example, 30 mm or less, preferably 20 mm or less.

An example of the air barrier layer 105 includes a resin-impregnated nonwoven fabric. The resin-impregnated nonwoven fabric includes a nonwoven fabric and a resin impregnated into the nonwoven fabric.

The nonwoven fabric is, for example, formed from fibers such as natural fibers including cotton, wool, hemp, pulp, silk, and mineral fiber; chemical fibers including rayon, nylon fiber, polyester fiber, vinylon fiber, acrylic fiber, aramid fiber, and polypropylene fiber; and glass fibers.

Of these examples of the nonwoven fabric, preferably, chemical fibers are used, more preferably, a polyester fiber and/or rayon are/is used, further more preferably, a polyester fiber is used in view of heat resistance and handleability.

An example of the polyester fiber includes a polyethylene terephthalate (PET) fiber.

The production method of the nonwoven fabric is not limited, and examples thereof include dry method, wet method, spunbond method, thermal bond method, chemical bond method, stitch bond method, needle punch method, melt blow method, spun lace method, and steam jet method. Preferably, a needle punch method is used in view of moldability of the heat insulating member 100.

The nonwoven fabric has a weight per unit area of, for example, 5 $g/m^2$ or more, preferably 50 $g/m^2$ or more, and for example, 1200 $g/m^2$ or less, preferably 500 $g/m^2$ or less, more preferably 200 $g/m^2$ or less.

As the resin, either a thermosetting resin or a thermoplastic resin may be used.

Examples of the thermosetting resin include phenolic resin and resorcin resin (resorcinol resin).

Examples of the thermoplastic resin include polyester resin, acrylic resin, urethane resin, styrene butadiene rubber (SBS), polyvinylchloride resin, and polyolefin resin.

Of these examples of the resin, preferably, a thermosetting resin is used, more preferably, a resorcin resin is used in view of moldability.

Each of the air barrier layers 105 (105a and 105b) has a thickness of, for example, 0.1 mm or more, preferably 0.2 mm or more, and for example, 1.5 mm or less, preferably 1.0 mm or less.

Each of the air barrier layers 105 (105a and 105b) has a weight per unit area of, for example, 10 $g/m^2$ or more, preferably 50 $g/m^2$ or more, and for example, 1200 $g/m^2$ or less, preferably 500 $g/m^2$ or less, more preferably 200 $g/m^2$ or less.

Next, as shown in FIG. 2B, the air barrier layers 105 are laminated on both faces of the foam sheet 110, thereby producing a laminate 111.

At this time, adhesives 112 are provided between the foam sheet 110 and the air barrier layers 105.

That is, the adhesives 112 are disposed (interposed) between one face of the foam sheet 110 and the other face of the first air barrier layer 105a, and between the other face of the foam sheet 110 and one face of the second air barrier layer 105b.

An example of the adhesive 112 includes a known adhesive. Preferably, a hot melt adhesive that is adherable by heating is used.

Examples of the disposition method of the adhesive 112 include a method in which a liquid adhesive is partially (to be specific, only a portion with respect to the low-density portion 103 of the laminate 111) applied to the foam sheet 110 or the air barrier layers 105 and a method in which a powdered adhesive adheres to the foam sheet 110 or the air barrier layers 105 so as to be scattered. Also, a commercially available product in which an adhesive adheres to the faces of the air barrier layers 105 in advance can be used.

Next, as shown in FIG. 2C, the laminate 111 is thermocompressed.

To be specific, one face and/or the other face of the laminate 111 are/is compressed with a heating plate having a shape corresponding to the high-density portion 102 and the low-density portion 103 so as to form the high-density portion 102 (upper-end high-density portion 102a, lower-end high-density portion 102b, left-end high-density portion 102c, and right-end high-density portion 102d) and the low-density portion 103.

At this time, the thermocompression is performed so that the pressure with respect to the portion in which the high-density portion 102 of the laminate 111 is formed is larger than the pressure with respect to the portion in which the low-density portion 103 thereof is formed. To be more specific, the portion corresponding to the high-density portion 102 of the laminate 111 is thermocompressed at a pressure high enough to extinguish the elastic force of the foam sheet 110, and the portion corresponding to the low-density portion 103 thereof is thermocompressed at a pressure low enough not to extinguish the elastic force of the foam sheet 110.

The heating plate has a temperature of, for example, 120° C. or more, preferably 140° C. or more, and for example, 230° C. or less, preferably 200° C. or less.

By the thermocompression, in the portion with respect to the high-density portion 102 of the laminate 111, the foam sheet 110 is relatively strongly compressed, thereby forming the compressed portion 104. Meanwhile, in the portion corresponding to the low-density portion 103 of the laminate 111, the foam sheet 110 is relatively weakly compressed, thereby forming the foam portion 106. By the thermocompression, the resin of the resin-impregnated nonwoven fabric of the air barrier layer 105 flows to be impregnated into the compressed portion 104.

In this manner, the wall member 101 in which the high-density portion 102 (upper-end high-density portion 102a, lower-end high-density portion 102b, left-end high-density portion 102c, and right-end high-density portion 102d) and the low-density portion 103 are integrally formed can be obtained. That is, the compressed portion 104 of the high-density portion 102 and the foam portion 106 of the low-density portion 103 are continuously integrated; the first air barrier layer 105a of the high-density portion 102 and the first air barrier layer 105a of the low-density portion 103 are continuously integrated; and the second air barrier layer 105b of the high-density portion 102 and the second air barrier layer 105b of the low-density portion 103 are continuously integrated.

There is no change in the thickness of the air barrier layer 105 after thermocompression and that of the air barrier layer 105 before thermocompression, and they are the same.

The high-density portion 102 includes the compressed portion 104, the first air barrier layer 105a provided on the upper face of the compressed portion 104, and the second air barrier layer 105b provided on the lower face of the compressed portion 104. The adhesives 112 (ref: FIG. 2B) are provided between the compressed portion 104 and the air barrier layers 105.

The compressed portion 104 is formed from a compressed body obtained by highly compressing the foam sheet 110. Unlike the foam of the foam portion 106 to be described later, the compressed body does not include many air bubbles (cells) inside thereof and consists of a hard body having no elasticity. The compressed portion 104 is impregnated with the resin of the resin-impregnated nonwoven fabric. In this case, the compressed portion 104 includes the compressed body and the resin impregnated into the compressed body to be solidified.

The compressed portion 104 has a compression ratio of, for example, 90% or more, preferably 92% or more, more preferably 95% or more, and for example, below 100%, preferably 99% or less.

The compression ratio of the compressed portion 104 is calculated by the formula: [{(thickness of foam sheet before compression)−(thickness of compressed body after compression)}/(thickness of foam sheet before compression)×100%].

The compressed portion 104 has a thickness of, for example, 0.1 mm or more, preferably 0.3 mm or more, and for example, 2.0 mm or less, preferably 1.0 mm or less.

The high-density portion 102 has density of above 0.45 g/cm$^3$, preferably 0.46 g/cm$^3$ or more, and for example, 2.0 g/cm$^3$ or less, preferably 1.0 g/cm$^3$ or less.

The high-density portion 102 has a thickness T1 of, for example, 0.1 mm or more, preferably 0.5 mm or more, and for example, 3.0 mm or less, preferably 2.0 mm or less.

The high-density portion 102 has a width W (distance from the outer side end edge to the inner side end edge) of, for example, 5.0 mm or more, preferably 10 mm or more, and for example, 500 mm or less, preferably 50 mm or less.

The low-density portion 103 includes the foam portion 106, the first air barrier layer 105a provided on the one face of the foam portion 106, and the second air barrier layer 105b provided on the other face of the foam portion 106. The adhesives 112 (ref: FIG. 2B) are provided between the foam portion 106 and the air barrier layers 105.

In the foam portion 106, the foam sheet 110 is formed from low-compression foam. The foam includes many air bubbles (cells) inside thereof and has elasticity in which a face is dented, when stress is applied thereto and the face returns to the original state, when the stress is released. Accordingly, the foam portion 106 is formed by compressing the foam sheet 110 and consists of foam including many air bubbles (cells) inside thereof, unlike the compressed body of the compressed portion 104.

The foam portion 106 has a compression ratio of, for example, below 90%, preferably 60% or less, more preferably 50% or less, further more preferably 30% or less, and for example, 0% or more, preferably 10% or more.

The compression ratio of the foam portion 106 is calculated by the formula: [{(thickness of foam sheet before compression)−(thickness of foam portion after compression)}/(thickness of foam sheet before compression)×100%].

The foam portion 106 has a thickness of, for example, 1.5 mm or more, preferably 5.0 mm or more, more preferably 10 mm or more, and for example, 20 mm or less, preferably 15 mm or less.

The low-density portion 103 has density of 0.45 g/cm$^3$ or less, preferably 0.20 g/cm$^3$ or less, more preferably 0.10 g/cm$^3$ or less, further more preferably 0.06 g/cm$^3$ or less, and for example, 0.01 g/cm$^3$ or more.

The low-density portion 103 has a thickness T2 of, for example, 2.0 mm or more, preferably 5.0 mm or more, more preferably 10 mm or more, and for example, 20 mm or less, preferably 15 mm or less.

The ratio (T1/T2) of the thickness T1 of the high-density portion 102 to the thickness T2 of the low-density portion 103 is, for example, 35% or less, preferably 15% or less, more preferably 10% or less, and for example, 1% or more, preferably 5% or more.

According to the heat insulating member 100, the high-density portion 102 is provided over the entire circumferential end edge (upper end edge, lower end edge, left end edge, and right end edge), and the low-density portion 103 is not disposed at the circumferential end edge. Thus, the mechanical strength of the circumferential end edge can be improved. Therefore, the durability is excellent.

Also, the high-density portion 102 is provided over the entire circumferential end edge and the thickness of the high-density portion 102 is formed thin. Thus, the entry of water from the circumferential end edge can be suppressed, so that the water resistance can be improved. Therefore, corrosion and a reduction in heat-insulating properties of the heat insulating member 100 can be suppressed.

The low-density portion 103 has density of 0.45 g/cm³ or less, so that it has excellent heat-insulating properties.

In the heat insulating member 100, the high-density portion 102 includes the compressed portion 104, the first air barrier layer 105a provided on the one face of the compressed portion 104, and the second air barrier layer 105b provided on the other face of the compressed portion 104. The low-density portion 103 includes the foam portion 106, the first air barrier layer 105a provided on the one face of the foam portion 106, and the second air barrier layer 105b provided on the other face of the foam portion 106.

Thus, the barrier properties of the air are improved, so that the heat-insulating properties of the heat insulating member 100 can be further more improved.

In the heat insulating member 100, the first air barrier layer 105a and the second air barrier layer 105b are the resin-impregnated nonwoven fabric including the nonwoven fabric and the resin impregnated into the nonwoven fabric.

Thus, the water resistance, chemical resistance, and moldability of the heat insulating member 100 can be improved.

In the heat insulating member 100, the compressed portion 104 is impregnated with the resin of the resin-impregnated nonwoven fabric.

Thus, the tight contact and integration of the compressed portion 104 with the first air barrier layer 105a and the second air barrier layer 105b can be achieved. As a result, the mechanical strength and water resistance of the high-density portion 102 can be further more improved.

In the heat insulating member 100, the adhesive 112 is partially provided between the compressed portion 104 and the foam portion 106, and the first air barrier layer 105a. Also, the adhesive 112 is partially provided between the compressed portion 104 and the foam portion 106, and the second air barrier layer 105b.

Thus, the first air barrier layer 105a and the second air barrier layer 105b strongly adhere to the high-density portion 102 and the low-density portion 103, so that the heat-insulating properties of the heat insulating member 100 can be more reliably improved.

In the heat insulating member 100, the compressed portion 104 is the compressed body obtained by compressing the foam sheet 110 and the foam portion 106 is the foam.

Thus, the compressed portion 104 and the foam portion 106 can be formed from one piece of foam sheet 110, so that the moldability is excellent. Also, the compressed portion 104 and the foam portion 106 are integrally formed, so that the mechanical strength of the wall member 101 is excellent.

1-3. Modified Example of Heat Insulating Member

In the wall member 101 in FIGS. 1A to 1B, the high-density portion 102 is formed over the entire circumferential end edge of the wall member 101. Alternatively, for example, though not shown, the high-density portion 102 can be also formed over only the one end edge (although not all of the upper-end high-density portion 102a, the lower-end high-density portion 102b, the left-end high-density portion 102c, and the right-end high-density portion 102d, at least one thereof) of the wall member 101.

That is, the wall member 101 may include at least one of the upper-end high-density portion 102a, the lower-end high-density portion 102b, the left-end high-density portion 102c, and the right-end high-density portion 102d. In other words, in at least one end edge of the upper end edge, the lower end edge, the left end edge, and the right end edge, the high-density portion 102 may be formed over the entire one end edge.

In the wall member 101 in FIGS. 1A to 1B, the high-density portion 102 is formed on only the circumferential end edge of the wall member 101. Alternatively, for example, though not shown, the high-density portion 102 can be also formed at the inside of the wall member 101.

The wall member 101 in FIGS. 1A to 1B is formed into a generally rectangular shape when viewed from the top in which each of the one end edges thereof is formed linearly. Alternatively, for example, though not shown, each of the one end edges thereof can be also formed in a curved shape.

In the wall member 101 in FIGS. 1A to 1B, the first air barrier layer 105a and the second air barrier layer 105b are provided in the foam sheet 110. Alternatively, for example, only one of the first air barrier layer 105a or the second air barrier layer 105b may be also provided. Or, both of the first air barrier layer 105a and the second air barrier layer 105b may not be provided.

In the wall member 101, the adhesive 112 is partially provided between the foam sheet 110 and the air barrier layers 105. Alternatively, the adhesive 112 can be also provided on the entire faces between the foam sheet 110 and the air barrier layers 105. In this case, the resin of the resin-impregnated nonwoven fabric of the air barrier layers 105 is not impregnated into the compressed portion 104 and the foam portion 106.

In the wall member 101, the foam sheet 110 and the air barrier layers 105 (105a and 105b) can be also thermally fused at the time of thermocompression without providing the adhesive 112 therebetween.

The heat insulating member 100 can be, for example, used in various industrial products such as vehicles, electrical products, and precision instruments requiring heat-insulating properties. The heat insulating member 100, in particular, is preferably used as a heat insulating member of engine portions of vehicles. To be specific, examples thereof include battery covers and shielding members.

Hereinafter, each of the battery cover and the shielding member using the heat insulating member 100 is described in detail.

2-1. Battery Cover

Figure 4:
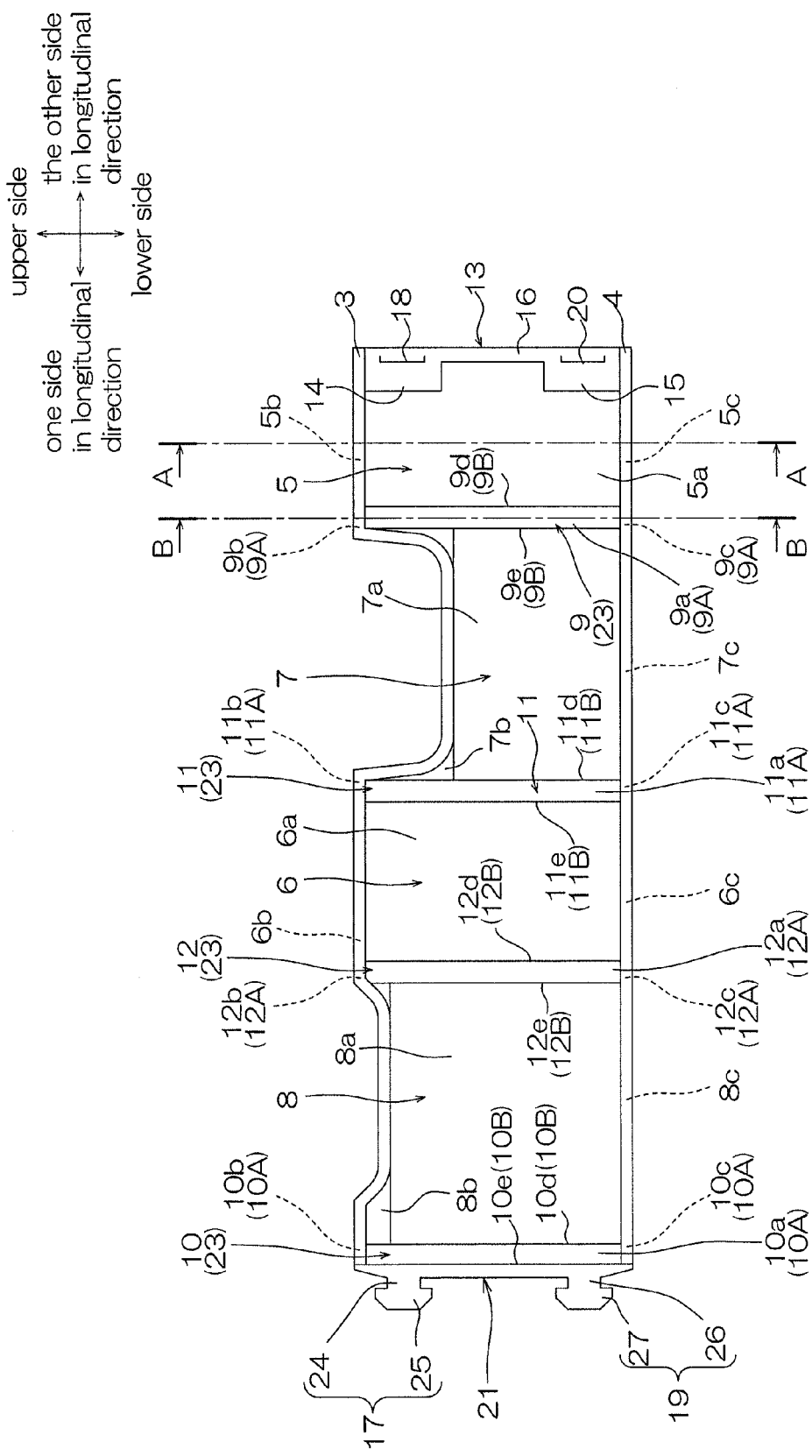
FIG. 4 shows a developed view of the battery cover shown in FIG. 3.
Figure 8:
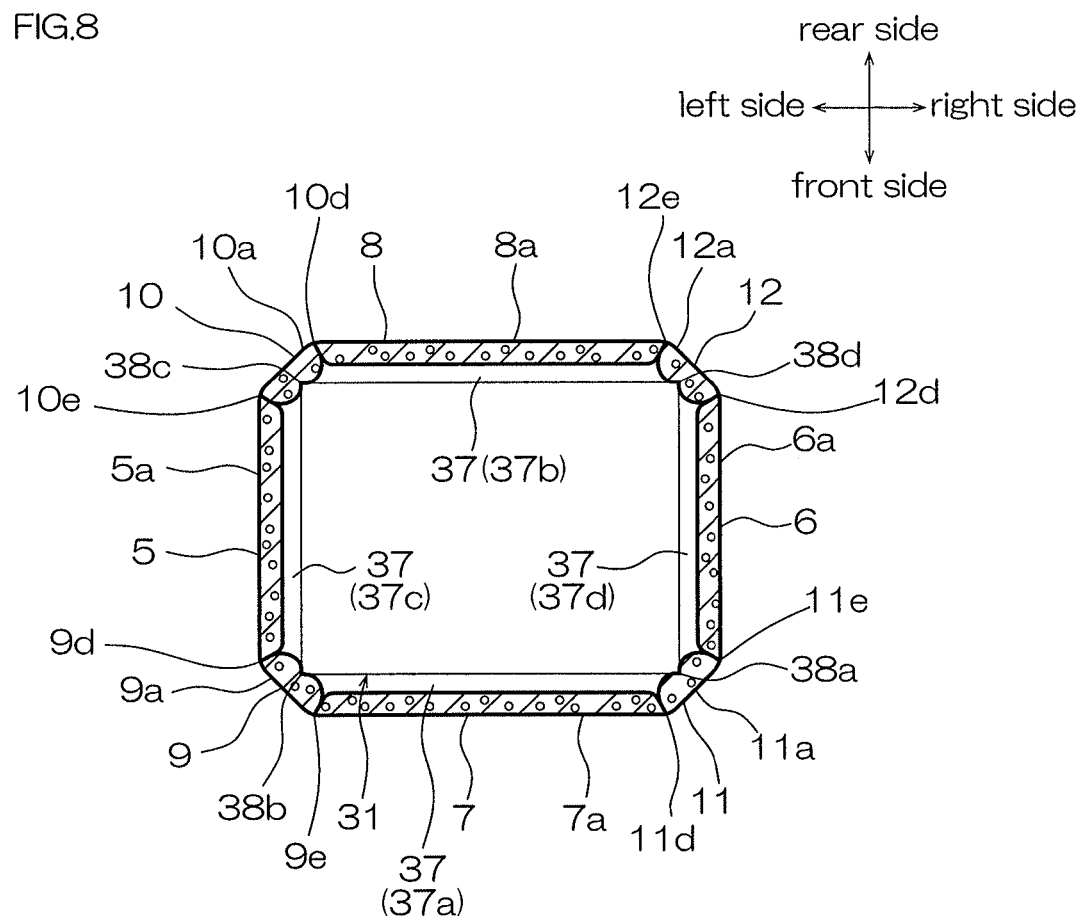
FIG. 8 shows a transverse cross-sectional view taken along D-D in FIG. 6.

The directions described below are in conformity with the direction arrows shown in FIGS. 3 and 6. The directions in FIGS. 7 and 8 are also in conformity with the directions shown in FIG. 3. The directions in FIG. 4 are as follows: upper side on the plane of the sheet is upper side (one side in a first direction), lower side on the plane of the sheet is lower side (the other side in the first direction), left side on the plane of the sheet is one side in a longitudinal direction of the battery cover (one side in a second direction), right side on the plane of the sheet is the other side in the longitudinal direction of the battery cover (the other side in the second direction), front side on the plane of the sheet is inner side of the battery cover (one side in a third direction), and far side on the plane of the sheet is outer side of the battery cover (the other side in the third direction). The directions in FIGS. 5, 9, and 10 are also in conformity with the directions shown in FIG. 4.

As shown in FIG. 3, a battery cover 1 has a prismatic shape extending in an up-down direction and is formed into a generally rectangular frame shape when viewed from the top. The battery cover 1 is formed of the above-described heat insulating member 100, and includes, as a wall member, a plurality of (four) side walls 2; as a wall member, a plurality of (four) connecting portions 23 that connect the side walls 2; as a spacer, a first spacer 3 provided at the upper end of the inner side face of the side walls 2 and the connecting portions 23; and a second spacer 4 provided at the lower end of the inner side face of the side walls 2 and the connecting portions 23 (ref: FIGS. 4 and 5A to 5B).

The four side walls 2 include a left wall 5 and a right wall 6 that are disposed to face each other in spaced-apart relation in a right-left direction, and a front wall 7 and a rear wall 8 that are disposed to face each other in spaced-apart relation in a front-rear direction.

The four connecting portions 23 include a left-front connecting portion 9 that connects the left wall 5 and the front wall 7, a left-rear connecting portion 10 that connects the left wall 5 and the rear wall 8, a right-front connecting portion 11 that connects the right wall 6 and the front wall 7, and a right-rear connecting portion 12 that connects the right wall 6 and the rear wall 8.

As shown in the developed view of FIG. 4, the side wall 2 and the connecting portion 23 are formed into a generally rectangular shape elongated in a circumferential direction (longitudinal direction). A thin portion (described later) that is made of the high-density portion is formed at the upper end portion and the lower end portion of the side wall 2 and the connecting portion 23, and a thick portion (described later) that is made of the low-density portion and having heat-insulating properties is formed at the central portion thereof. The first spacer 3 is provided at the thin portion of the upper end portion, and the second spacer 4 is provided at the thin portion of the lower end portion.

Each of the connecting portions 23 includes a connecting wall (described later) provided along the up-down direction and the two bending portions (described later) provided on both sides of the connecting wall.

At the connecting portion 23, one side wall 2 of the side walls 2 that are next to each other is connected to the connecting wall (described later) through one bending portion (described later), and the other side wall 2 is connected to the connecting wall through the other bending portion.

To be specific, as shown in FIG. 4, the left wall 5 is formed into a generally rectangular shape when viewed from the side having a longer length in the up-down direction than the length in the longitudinal direction.

The left wall 5 integrally includes a left thick portion 5a that is made of the low-density portion, a left-upper thin portion 5b that is made of the high-density portion, and a left-lower thin portion 5c that is made of the high-density portion.

The left thick portion 5a is formed into a generally rectangular shape when viewed from the side at generally a center of the left wall 5 in the up-down direction. The left thick portion 5a bulges toward inside as shown in FIG. 5A.

The left-upper thin portion 5b is formed above and next to the left thick portion 5a over the entire upper end edge of the left wall 5 as shown in the broken line in FIG. 4, and FIG. 5A. The left-upper thin portion 5b is formed into a generally rectangular shape extending in the longitudinal direction when viewed from the side. The left-upper thin portion 5b has a length in the up-down direction that is generally the same as the length in the up-down direction of the first spacer 3.

The left-lower thin portion 5c is formed below and next to the left thick portion 5a over the entire lower end edge of the left wall 5 as shown in the broken line in FIG. 4, and FIG. 5A. The left-lower thin portion 5c is formed into a generally rectangular shape extending in the longitudinal direction when viewed from the side. The left-lower thin portion 5c has a length in the up-down direction that is generally the same as the length in the up-down direction of the second spacer 4.

A thickness X1 (distance from the inner side face to the outer side face) of the left-upper thin portion 5b and a thickness Y1 (distance from the inner side face to the outer side face) of the left-lower thin portion 5c are formed so as to be smaller than a thicknesses L1 of the left thick portion 5a. The thickness X1 of the left-upper thin portion 5b is formed so as to be generally the same as the thickness Y1 of the left-lower thin portion 5c.

As shown in FIG. 4, a to-be-engaged portion 13 is provided at the other side end portion in the longitudinal direction of the left wall 5.

The to-be-engaged portion 13 is provided so as to engage with an engagement portion 21 (described later) at the left-rear connecting portion 10 to keep the battery cover 1 tubular. The to-be-engaged portion 13 is formed of the thin portion (high-density portion) and has a generally U-shape opening into one side in the longitudinal direction. The to-be-engaged portion 13 integrally includes a first to-be-engaged portion 14, a second to-be-engaged portion 15 disposed below the first to-be-engaged portion 14 in spaced-apart relation, and an overlap portion 16 that connects the first to-be-engaged portion 14 and the second to-be-engaged portion 15.

The first to-be-engaged portion 14 has a generally rectangular shape when viewed from the side, and a first slit 18 for inserting a first projection portion 17 (described later) is formed at a center in the up-down direction along the up-down direction.

The second to-be-engaged portion 15 has a generally rectangular shape when viewed from the side, and a second slit 20 for inserting a second projection portion 19 (described later) is formed at a center in the up-down direction along the up-down direction. The length in the up-down direction and the length in the longitudinal direction of the second to-be-engaged portion 15 and the first to-be-engaged portion 14 are generally the same. The second slit 20 and the first slit 18 have generally the same length in the up-down direction. That is, the shape of the second to-be-engaged portion 15 is generally the same as the shape of the first to-be-engaged portion 14.

The overlap portion 16 has a generally rectangular shape when viewed from the side, and is formed so that its length in the longitudinal direction is shorter than the length in the longitudinal direction of the first to-be-engaged portion 14.

The end portion of the first to-be-engaged portion 14, the second to-be-engaged portion 15, and the overlap portion 16 of the other side in the longitudinal direction is formed to be flush.

The left-front connecting portion 9 is formed integrally with the left wall 5 at one side in the longitudinal direction of the left wall 5.

The left-front connecting portion 9 is formed to be long and narrow in the up-down direction, and integrally includes a left-front connecting wall 9A and a left-front bending portion 9B that is disposed at both sides in the circumferential direction of the left-front connecting wall 9A. The left-front connecting wall 9A includes a left-front thick portion 9a that is made of the low-density portion, a left-front-upper thin portion 9b that is made of the high-density portion, and a left-front-lower thin portion 9c that is made of the high-density portion. The left-front bending portion 9B is made of the high-density portion and includes two left-front bending portions 9d and 9e.

The left-front thick portion 9a has a generally rectangular shape when viewed from the side along the up-down direction and is formed to be thick, bulging inwardly. The left-front thick portion 9a is formed so that its thickness L2 (distance from the inner side face to the outer side face) is the same as or smaller than the thickness of the left thick portion 5a.

The left-front-upper thin portion 9b is formed above and next to the left-front thick portion 9a as shown in the broken line in FIG. 4, and FIG. 5B. The left-front-upper thin portion 9b is formed into a generally rectangular shape when viewed from the side. The left-front-upper thin portion 9b has a length in the up-down direction that is generally the same as the length in the up-down direction of the first spacer 3.

The left-front-lower thin portion 9c is formed below and next to the left-front thick portion 9a as shown in the broken line in FIG. 4, and FIG. 5B. The left-front-lower thin portion 9c is formed into a generally rectangular shape when viewed from the side. The left-front-lower thin portion 9c has a length in the up-down direction that is generally the same as the length in the up-down direction of the second spacer 4.

A thickness X2 of the left-front-upper thin portion 9b and a thickness Y2 of the left-front-lower thin portion 9c are formed so as to be smaller than the thicknesses L2 of the left-front thick portion 9a. The thickness X2 of the left-front-upper thin portion 9b is formed to be generally the same as the thickness Y2 of the left-front-lower thin portion 9c. The thickness X2 of the left-front-upper thin portion 9b is formed so as to be generally the same as the thickness X1 of the left-upper thin portion 5b.

The two left-front bending portions 9d and 9e are formed next to the left-front thick portion 9a, the left-front-upper thin portion 9b, and the left-front-lower thin portion 9c on one side and the other side in the longitudinal direction. The two left-front bending portions 9d and 9e are formed from the thin portion (high-density portion) into lines extending in the up-down direction. The length in the up-down direction of the left-front bending portions 9d and 9e is the same as a total of the length in the up-down direction of the left-front thick portion 9a, the left-front-upper thin portion 9b, and the left-front-lower thin portion 9c.

The left-front thick portion 9a is connected to the left wall 5 through the one left-front bending portion 9d and is connected to the front wall 7 through the other left-front bending portion 9e.

On the one side in the longitudinal direction of the left-front connecting portion 9, the front wall 7 is formed integrally with the left-front connecting portion 9.

The front wall 7 has a generally rectangular shape when viewed from the side having a length longer than the left wall 5 in the longitudinal direction, and its upper end portion is cut in a generally U-shape opening toward above when viewed from the side. The front wall 7 integrally includes a front thick portion 7a that is made of the low-density portion, a front-upper thin portion 7b that is made of the high-density portion, and a front-lower thin portion 7c that is made of the high-density portion.

The front thick portion 7a is formed into a generally rectangular shape when viewed from the side at generally a center in the up-down direction of the front wall 7. The front thick portion 7a bulges toward inside. The front thick portion 7a has a thickness (distance from the inner side face to the outer side face) that is generally the same as the thickness of the left thick portion 5a.

The front-upper thin portion 7b is formed above and next to the front thick portion 7a over the entire upper end edge of the front wall 7. The upper end edge of the front-upper thin portion 7b is formed into a generally U-shape along the upper end portion of the front wall 7. The front-upper thin portion 7b has a thickness that is generally the same as the thickness of the left-upper thin portion 5b.

The front-lower thin portion 7c is formed below and next to the front thick portion 7a over the entire lower end edge of the front wall 7 as shown in the broken line in FIG. 4. The front-lower thin portion 7c is formed into a generally rectangular shape extending in the longitudinal direction when viewed from the side. The front-lower thin portion 7c has a length in the up-down direction that is generally the same as the length in the up-down direction of the second spacer 4. The front-lower thin portion 7c has a thickness that is generally the same as the thickness of the left-lower thin portion 5c.

On the one side in the longitudinal direction of the front wall 7, a right-front connecting portion 11 is formed integrally with the front wall 7.

The right-front connecting portion 11 is formed into generally the same shape as that of the left-front connecting portion 9 to be long and narrow in the up-down direction, and integrally includes a right-front connecting wall 11A and a right-front bending portion 11B that is disposed at both sides in the circumferential direction of the right-front connecting wall 11A. The right-front connecting wall 11A includes a right-front thick portion 11a that is made of the low-density portion, a right-front-upper thin portion 11b that is made of the high-density portion, and a right-front-lower thin portion 11c that is made of the high-density portion. The right-front bending portion 11B includes two right-front bending portions 11d and 11e.

The right-front thick portion 11a has a generally rectangular shape along the up-down direction when viewed from the side, and is formed to be thick, bulging toward inside. The right-front thick portion 11a has a thickness that is generally the same as the thickness of the left-front thick portion 9a.

The right-front-upper thin portion 11b is formed above and next to the right-front thick portion 11a as shown in the broken line in FIG. 4. The right-front-upper thin portion 11b is formed into a generally rectangular shape when viewed from the side. The right-front-upper thin portion 11b has a length in the up-down direction that is generally the same as the length in the up-down direction of the first spacer 3. The right-front-upper thin portion 11b is formed so as to have a thickness that is generally the same as the thickness of the left-upper thin portion 5b.

The right-front-lower thin portion 11c is formed below and next to the right-front thick portion 11a as shown in the broken line in FIG. 4. The right-front-lower thin portion 11c is formed into a generally rectangular shape when viewed from the side. The right-front-lower thin portion 11c has a length in the up-down direction that is generally the same as the length in the up-down direction of the second spacer 4. The right-front-lower thin portion 11c is formed so as to have a thickness that is generally the same as the thickness of the left-lower thin portion 5c.

The two right-front bending portions 11d and 11e are formed next to the right-front thick portion 11a, the right-front-upper thin portion 11b, and the right-front-lower thin portion 11c on one side and the other side in the longitudinal direction. The two right-front bending portions 11d and 11e are formed from the thin portion (high-density portion) into lines extending in the up-down direction. The length in the up-down direction of the right-front bending portions 11d and 11e is the same as a total of the length in the up-down direction of the right-front thick portion 11a, the right-front-upper thin portion 11b, and the right-front-lower thin portion 11c.

The right-front thick portion 11a is connected to the front wall 7 through the one right-front bending portion 11d and is connected to the right wall 6 through the other right-front bending portion 11e.

On the one side in the longitudinal direction of the right-front connecting portion 11, the right wall 6 is formed integrally with the right-front connecting portion 11.

The right wall 6 has a generally rectangular shape when viewed from the side having a length in the longitudinal direction that is generally the same as that of the left wall 5 and is shorter than the front wall 7. The right wall 6 integrally includes a right thick portion 6a that is made of the low-density portion, a right-upper thin portion 6b that is made of the high-density portion, and a right-lower thin portion 6c that is made of the high-density portion.

The right thick portion 6a is formed into a generally rectangular shape when viewed from the side at generally a center in the up-down direction of the right wall 6. The right thick portion 6a bulges toward inside. The right thick portion 6a is formed so as to have a thickness that is generally the same as the thickness of the left thick portion 5a.

The right-upper thin portion 6b is formed above and next to the right thick portion 6a over the entire upper end edge of the right wall 6 as shown in the broken line in FIG. 4. The right-upper thin portion 6b is formed into a generally rectangular shape extending in the longitudinal direction when viewed from the side. The right-upper thin portion 6b has a length in the up-down direction that is generally the same as the length in the up-down direction of the first spacer 3. The right-upper thin portion 6b has a thickness that is generally the same as the thickness of the left-upper thin portion 5b.

The right-lower thin portion 6c is formed below and next to the right thick portion 6a over the entire lower end edge of the right wall 6 as shown in the broken line in FIG. 4. The right-lower thin portion 6c is formed into a generally rectangular shape extending in the longitudinal direction when viewed from the side. The right-lower thin portion 6c has a length in the up-down direction that is generally the same as the length in the up-down direction of the second spacer 4. The right-lower thin portion 6c has a thickness that is generally the same as the thickness of the left-lower thin portion 5c.

On the one side in the longitudinal direction of the right wall 6, a right-rear connecting portion 12 is formed integrally with the right wall 6.

The right-rear connecting portion 12 is formed into generally the same shape as that of the left-front connecting portion 9 to be long and narrow in the up-down direction, and integrally includes a right-rear connecting wall 12A and a right-rear bending portion 12B that is disposed at both sides in the circumferential direction of the right-rear connecting wall 12A. The right-rear connecting wall 12A includes a right-rear thick portion 12a that is made of the low-density portion, a right-rear-upper thin portion 12b that is made of the high-density portion, and a right-rear-lower thin portion 12c that is made of the high-density portion. The right-rear bending portion 12B includes two right-rear bending portions 12d and 12e.

The right-rear thick portion 12a has a generally rectangular shape along the up-down direction when viewed from the side and is formed to be thick, bulging toward inside.

The right-rear thick portion 12a has a thickness that is generally the same as the thickness of the left-front thick portion 9a.

The right-rear-upper thin portion 12b is formed above and next to the right-rear thick portion 12a as shown in the broken line in FIG. 4. The right-rear-upper thin portion 12b is formed into a generally rectangular shape when viewed from the side. The right-rear-upper thin portion 12b has a length in the up-down direction that is generally the same as the length in the up-down direction of the first spacer 3. The right-rear-upper thin portion 12b is formed so as to have a thickness that is generally the same as the thickness of the left-upper thin portion 5b.

The right-rear-lower thin portion 12c is formed below and next to the right-rear thick portion 12a as shown in the broken line in FIG. 4. The right-rear-lower thin portion 12c is formed into a generally rectangular shape when viewed from the side. The right-rear-lower thin portion 12c has a length in the up-down direction that is generally the same as the length in the up-down direction of the second spacer 4. The right-rear-lower thin portion 12c is formed so as to have a thickness that is generally the same as the thickness of the left-lower thin portion 5c.

The two right-rear bending portions 12d and 12e are formed next to the right-rear thick portion 12a, the right-front-upper thin portion 11b, and the right-front-lower thin portion 11c on one side and the other side in the longitudinal direction. The two right-rear bending portions 12d and 12e are formed from the thin portion (high-density portion) into lines extending in the up-down direction. The length in the up-down direction of the right-rear bending portions 12d and 12e is the same as a total of the length in the up-down direction of the right-rear thick portion 12a, the right-rear-upper thin portion 12b, and the right-rear-lower thin portion 12c.

The right-rear thick portion 12a is connected to the right wall 6 through the one right-rear bending portion 12d and is connected to the rear wall 8 through the other right-rear bending portion 12e.

On the one side in the longitudinal direction of the right-rear connecting portion 12, the rear wall 8 is formed integrally with the right-rear connecting portion 12.

The rear wall 8 has a generally rectangular shape when viewed from the side having a length that is generally the same as that of the front wall 7 in the longitudinal direction and is longer than the right wall 6. The upper end portion of the rear wall 8 is cut in a generally U-shape opening toward above when viewed from the side so as to be shallower than the upper end portion of the front wall 7. The rear wall 8 integrally includes a rear thick portion 8a that is made of the low-density portion, a rear-upper thin portion 8b that is made of the high-density portion, and a rear-lower thin portion 8c that is made of the high-density portion.

The rear thick portion 8a is formed into a generally rectangular shape when viewed from the side at generally a center in the up-down direction of the rear wall 8. The rear thick portion 8a bulges toward inside. The rear thick portion 8a has a thickness that is generally the same as the thickness of the left thick portion 5a.

The rear-upper thin portion 8b is formed above and next to the rear thick portion 8a over the entire upper end edge of the rear wall 8. The upper end edge of the rear-upper thin portion 8b is formed into a generally U-shape along the upper end portion of the rear wall 8. The rear-upper thin portion 8b has a thickness that is generally the same as the thickness of the left-upper thin portion 5b.

The rear-lower thin portion 8c is formed below and next to the rear thick portion 8a over the entire lower end edge of the rear wall 8 as shown in the broken line in FIG. 4. The rear-lower thin portion 8c is formed into a generally rectangular shape extending in the longitudinal direction when viewed from the side. The rear-lower thin portion 8c has a length in the up-down direction that is generally the same as the length in the up-down direction of the second spacer 4. The rear-lower thin portion 8c has a thickness that is generally the same as the thickness of the left-lower thin portion 5c.

On the one side in the longitudinal direction of the rear wall 8, a left-rear connecting portion 10 is formed integrally with the rear wall 8.

The left-rear connecting portion 10 is formed into generally the same shape as that of the left-front connecting portion 9 to be long and narrow in the up-down direction, and integrally includes a left-rear connecting wall 10A and a left-rear bending portion 10B that is disposed at both sides in the circumferential direction of the left-rear connecting wall 10A. The left-rear connecting wall 10A includes a left-rear thick portion 10a that is made of the low-density portion, a left-rear-upper thin portion 10b that is made of the high-density portion, and a left-rear-lower thin portion 10c that is made of the high-density portion. The left-rear bending portion 10B includes two left-rear bending portions 10d and 10e.

The left-rear thick portion 10a has a generally rectangular shape along the up-down direction when viewed from the side and is formed to be thick, bulging toward inside. The left-rear thick portion 10a has a thickness that is generally the same as the thickness of the left-front thick portion 9a.

The left-rear-upper thin portion 10b is formed above and next to the left-rear thick portion 10a as shown in the broken line in FIG. 4. The left-rear-upper thin portion 10b is formed into a generally rectangular shape when viewed from the side. The left-rear-upper thin portion 10b has a length in the up-down direction that is generally the same as the length in the up-down direction of the first spacer 3. The left-rear-upper thin portion 10b is formed so as to have a thickness that is generally the same as the thickness of the left-upper thin portion 5b.

The left-rear-lower thin portion 10c is formed below and next to the left-rear thick portion 10a as shown in the broken line in FIG. 4. The left-rear-lower thin portion 10c is formed into a generally rectangular shape when viewed from the side. The left-rear-lower thin portion 10c has a length in the up-down direction that is generally the same as the length in the up-down direction of the second spacer 4. The left-rear-lower thin portion 10c is formed so as to have a thickness that is generally the same as the thickness of the left-lower thin portion 5c.

The two left-rear bending portions 10d and 10e are formed next to the left-rear thick portion 10a, the left-rear-upper thin portion 10b, and the left-rear-lower thin portion 10c on one side and the other side in the longitudinal direction. The two left-rear bending portions 10d and 10e are formed from the thin portion (high-density portion) into lines extending in the up-down direction. The length in the up-down direction of the left-rear bending portions 10d and 10e is the same as a total of the length in the up-down direction of the left-rear thick portion 10a, the left-rear-upper thin portion 10b, and the left-rear-lower thin portion 10c.

The left-rear thick portion 10a is connected to the rear wall 8 through the one left-rear bending portion 10d and is connected to the engagement portion 21 (described later) through the other left-rear bending portion 10e.

The left-rear connecting portion 10 includes the engagement portion 21 that is made of the high-density portion at its one end portion in the longitudinal direction. The engagement portion 21 is formed from the thin portion (high-density portion), and includes the first projection portion 17 and the second projection portion 19 on one side in the longitudinal direction thereof.

The first projection portion 17 projects in one longitudinal direction at an upper portion of the engagement portion 21, and integrally includes a first projection 24 having a generally rectangular shape when viewed from the side and a head portion 25 bulging upward or downward from one end portion in the longitudinal direction of the first projection 24.

The first projection 24 is formed so as to have a length in the up-down direction that is generally the same as the length in the up-down direction of the first slit 18.

The second projection portion 19 is provided below the first projection portion 17 in spaced-apart relation and is formed to project toward one longitudinal direction of the engagement portion 21. The second projection portion 19 is formed into a shape that is generally the same as that of the first projection portion 17. That is, the second projection portion 19 projects in one longitudinal direction at a lower portion of the engagement portion 21, and integrally includes a second projection 26 having a generally rectangular shape when viewed from the side and a second head portion 27 bulging upward or downward from one end portion in the longitudinal direction of the second projection 26.

The second projection 26 is formed so as to have a length in the up-down direction that is generally the same as the length in the up-down direction of the second slit 20.

Each of the four connecting portions 23 (left-front connecting portion 9, left-rear connecting portion 10, right-front connecting portion 11, and right-rear connecting portion 12) forms folding portions 28, allowing the battery cover 1 to be folded so that the inner side face of the side walls 2 makes contact.

The first spacer 3 is provided at the upper end edge of the inner side face of each of the side walls 2 and each of the connecting portions 23 of the battery cover 1. To be more specific, the first spacer 3 is provided continuously along the upper end edge of the inner side face of the left-upper thin portion 5b, the left-front-upper thin portion 9b, the front-upper thin portion 7b, the right-front-upper thin portion 11b, the right-upper thin portion 6b, the right-rear-upper thin portion 12b, the rear-upper thin portion 8b, and the left-rear-upper thin portion 10b. The first spacer 3 is disposed on the side walls 2 and the connecting portions 23 so that the upper end portion of the side walls 2 and the connecting portions 23 is flush with the upper end portion of the first spacer 3.

The inner side face of the first spacer 3 is positioned at an inner side than the inner side face of the thick portions (left thick portion 5a, right thick portion 6a, front thick portion 7a, and rear thick portion 8a) of the side walls 2 and is positioned at an inner side than the inner side face of the connecting walls (left-front thick portion 9a, left-rear thick portion 10a, right-front thick portion 11a, and right-rear thick portion 12a) of the connecting portions 23.

The first spacer 3 is formed into a generally rectangular shape when viewed in cross section extending in the longitudinal direction and is formed from foam (sponge).

On the lower end edge of the inner side face of the side walls 2 and the connecting portions 23 of the battery cover 1, the second spacer 4 is provided. To be more specific, the second spacer 4 is provided continuously along the lower end edge of the inner side face of the left-lower thin portion 5*c*, the left-front-lower thin portion 9*c*, the front-lower thin portion 7*c*, the right-front-lower thin portion 11*c*, the right-lower thin portion 6*c*, the right-rear-lower thin portion 12*c*, the rear-lower thin portion 8*c*, and the left-rear-lower thin portion 10*c*. The second spacer 4 is disposed on the side walls 2 and the connecting portions 23 so that the lower end face of the side walls 2 and the connecting portions 23 is flush with the lower end face of the second spacer 4.

The inner side face of the second spacer 4 is positioned at an inner side than the inner side face of the thick portions (left thick portion 5*a*, right thick portion 6*a*, front thick portion 7*a*, and rear thick portion 8*a*) of the side walls 2 and is positioned at an inner side than the inner side face of the connecting walls (left-front thick portion 9*a*, left-rear thick portion 10*a*, right-front thick portion 11*a*, and right-rear thick portion 12*a*) of the connecting portions 23.

The second spacer 4 is formed into a generally rectangular shape when viewed in cross section extending in the longitudinal direction. The second spacer 4 is formed from the same material as that of the first spacer 3, that is, from foam (sponge).

At the upper end edge of the battery cover 1, the thin portion that is made of the high-density portion is formed over the one round thereof. To be specific, the left-upper thin portion 5*b*, the left-front-upper thin portion 9*b*, the front-upper thin portion 7*b*, the right-front-upper thin portion 11*b*, the right-upper thin portion 6*b*, the right-rear-upper thin portion 12*b*, the rear-upper thin portion 8*b*, and the left-rear-upper thin portion 10*b* are continuously formed over the entire upper end edge of the side walls 2 and the connecting portions 23. All of the thin portions formed at the upper end edge are formed so as to have generally the same thickness.

At the lower end edge of the battery cover 1, the thin portion that is made of the high-density portion is formed over the one round thereof. To be specific, the left-lower thin portion 5*c*, the left-front-lower thin portion 9*c*, the front-lower thin portion 7*c*, the right-front-lower thin portion 11*c*, the right-lower thin portion 6*c*, the right-rear-lower thin portion 12*c*, the rear-lower thin portion 8*c*, and the left-rear-lower thin portion 10*c* are continuously formed over the entire lower end edge of the side walls 2 and the connecting portions 23. All of the thin portions formed at the lower end edge are formed so as to have generally the same thickness.

2-2. Battery Cover Production Method

Next, the method for producing the battery cover 1 is described. The same explanation as that of the heat insulating member 100 is omitted.

First, the foam sheet 110 and the two air barrier layers 105 (105*a* and 105*b*) are prepared, and the foam sheet 110 is disposed between the two air barrier layers 105.

Next, the air barrier layers 105 are laminated on both faces of the foam sheet 110, thereby producing the laminate 111.

At this time, the adhesives 112 are provided between the foam sheet 110 and the air barrier layers 105 as needed.

Then, predetermined portions of the laminate 111 are thermocompressed to form the thick portion and the thin portion. To be specific, the laminate 111 is compressed with a heating plate having a shape corresponding to the thick portions and the thin portions so as to produce the thick portions (left thick portion 5*a*, right thick portion 6*a*, front thick portion 7*a*, rear thick portion 8*a*, left-front thick portion 9*a*, left-rear thick portion 10*a*, right-front thick portion 11*a*, and right-rear thick portion 12*a*) and the thin portions (left-upper thin portion 5*b*, left-front-upper thin portion 9*b*, front-upper thin portion 7*b*, right-front-upper thin portion 11*b*, right-upper thin portion 6*b*, right-rear-upper thin portion 12*b*, rear-upper thin portion 8*b*, left-rear-upper thin portion 10*b*, left-lower thin portion 5*c*, left-front-lower thin portion 9*c*, front-lower thin portion 7*c*, right-front-lower thin portion 11*c*, right-lower thin portion 6*c*, right-rear-lower thin portion 12*c*, rear-lower thin portion 8*c*, left-rear-lower thin portion 10*c*, left-front bending portions 9*d* and 9*e*, left-rear bending portions 10*d* and 10*e*, right-front bending portions 11*d* and 11*e*, right-rear bending portions 12*d* and 12*e*, engagement portion 21, and to-be-engaged portion 13).

At this time, the thermocompression is performed so that the pressure with respect to the thin portion is larger than the pressure with respect to the thick portion. To be more specific, the portion corresponding to the thin portion is thermocompressed at a pressure high enough to extinguish the elastic force of the foam sheet 110, and the portion corresponding to the thick portion is thermocompressed at a pressure low enough not to extinguish the elastic force of the foam sheet 110.

In this manner, the thin portion that is made of the high-density portion and the thick portion that is made of the low-density portion can be integrally formed.

The left thick portion 5*a* has a thickness L1 of, for example, 2.0 mm or more, preferably 5.0 mm or more, more preferably 10 mm or more, and for example, 20 mm or less, preferably 15 mm or less. The front thick portion 7*a*, the right thick portion 6*a*, and the rear thick portion 8*a* have a thickness of the above-described range.

The left-front thick portion 9*a* has a thickness L2 of, for example, 1.0 mm or more, preferably 2.0 mm or more, and for example, 15 mm or less, preferably 10 mm or less. The right-front thick portion 11*a*, the right-rear thick portion 12*a*, and the left-rear thick portion 10*a* have a thickness of the above-described range.

Each of the thin portions has a thickness, that is, X1, X2, Y1, and Y2, of generally the same, to be specific, for example, 0.1 mm or more, preferably 0.5 mm or more, and for example, 3.0 mm or less, preferably 2.0 mm or less.

The left-upper thin portion 5*b*, the left-front-upper thin portion 9*b*, the front-upper thin portion 7*b*, the right-front-upper thin portion 11*b*, the right-upper thin portion 6*b*, the right-rear-upper thin portion 12*b*, the rear-upper thin portion 8*b*, the left-rear-upper thin portion 10*b*, the left-lower thin portion 5*c*, the left-front-lower thin portion 9*c*, the front-lower thin portion 7*c*, the right-front-lower thin portion 11*c*, the right-lower thin portion 6*c*, the right-rear-lower thin portion 12*c*, the rear-lower thin portion 8*c*, and the left-rear-lower thin portion 10*c* have a length (distance from the outer end edge to the inner end edge) in the up-down direction of, for example, 5.0 mm or more, preferably 10 mm or more, and for example, 500 mm or less, preferably 50 mm or less.

Each of the bending portions (left-front bending portions 9*d* and 9*e*, left-rear bending portions 10*d* and 10*e*, right-front bending portions 11*d* and 11*e*, and right-rear bending portions 12*d* and 12*e*) has a length in the longitudinal direction of, for example, to be specific, 2 mm or more, preferably 6 mm or more, and for example, 35 mm or less, preferably 20 mm or less.

Then, trimming is performed. To be more specific, the laminate 111 is cut along the outer side of the developed view (FIG. 4) of the battery cover 1.

In this manner, a battery cover wall member in which the left wall 5, the left-front connecting portion 9, the front wall 7, the right-front connecting portion 11, the right wall 6, the right-rear connecting portion 12, the rear wall 8, and the left-rear connecting portion 10 are continuously and integrally molded in this sequence is produced.

Then, the elongated first spacer 3 having a generally rectangular shape when viewed from the side is bonded along the upper end edge of the inner side face of the battery cover wall member.

The first spacer 3 is formed from foam. Examples of the foam used for the first spacer 3 include ethylene-propylene-diene rubber foam (EPDM foam), ethylene-propylene foam (EPM foam), polyurethane foam, polystyrene foam, polyolefin foam, and chloroprene foam. Preferably, EPDM foam is used.

The first spacer 3 has a thickness (distance from the innermost side to the outermost side) of, for example, 1 mm or more, preferably 5 mm or more, more preferably 10 mm or more, and for example, 30 mm or less, preferably 15 mm or less. The first spacer 3 has a length in the up-down direction of, for example, 3 mm or more, preferably 7 mm or more, and for example, 15 mm or less, preferably 10 mm or less.

Then, the elongated second spacer 4 having a generally rectangular shape when viewed from the side is bonded along the lower end edge of the inner side face of the battery cover wall member.

The second spacer 4 is formed from foam. Examples of the foam include those shown as examples of the first spacer 3. Preferably, EPDM foam is used. The second spacer 4 has a thickness and a length in the up-down direction that are generally the same as the thickness and the length in the up-down direction of the first spacer 3.

Then, by inserting the first projection portion 17 and the second projection portion 19 of the left-rear connecting portion 10 to the first slit 18 and the second slit 20 of the left wall 5, respectively, the prismatic battery cover 1 in which the left wall 5 and the left-rear connecting portion 10 are connected is produced.

To be specific, as described above, the battery cover 1 is formed into a generally rectangular shape elongated in the right-left direction when viewed from the top, the front wall 7 and the rear wall 8 facing each other in spaced-apart relation in the front-rear direction, and the left wall 5 and the right wall 6 facing each other in spaced-apart relation in the right-left direction.

Then, at the four corners of the battery cover 1, the side walls 2 (front wall 7 and left wall 5, left wall 5 and rear wall 8, rear wall 8 and right wall 6, and right wall 6 and front wall 7) that are disposed next to each other generally at right angles are connected through the connecting portions 23 (left-front connecting portion 9, left-rear connecting portion 10, right-front connecting portion 11, and right-rear connecting portion 12). At the connecting portions 23, the two bending portions (left-front bending portions 9d and 9e, left-rear bending portions 10d and 10e, right-front bending portions 11d and 11e, and right-rear bending portions 12d and 12e) sandwiching the connecting walls (left-front thick portion 9a, left-rear thick portion 10a, right-front thick portion 11a, and right-rear thick portion 12a) are bent to allow for the side walls 2 that are next to each other to be disposed at generally right angles.

That is, one side wall 2 (e.g., front wall 7) of the side walls 2 that are next to each other is connected to the connecting portion 23 (e.g., left-front connecting portion 9) so that an obtuse angle (e.g., 100 to 175 degrees, preferably 120 to 150 degrees, most preferably 135 degrees) is formed inside the prismatic shape by bending at one bending portion (e.g., left-front bending portion 9e). The other side wall 2 (e.g., left wall 5) of the side walls 2 that are next to each other is connected to the other connecting portion 23 (e.g., left-front connecting portion 9) so that an obtuse angle is formed inside the prismatic shape by bending at the other bending portion (e.g., bending portion 9d).

In this manner, by forming the two angles (obtuse angles) with the connecting portion 23 and the side walls 2 that are disposed next to each other at generally right angles, each of the four corners of the battery cover 1 is formed into a generally trapezoid when viewed from the top.

2-3. Battery Insertion

As shown in FIG. 6, a battery 31 is a secondary battery boarded on, for example, vehicles and ships (preferably, secondary battery boarded on vehicles) and is filled with a battery fluid 32 therein.

The battery 31 is formed into a generally rectangular parallelepiped shape. Two terminals 33 are provided on the top face of the battery 31. A battery fluid detection portion 35 is provided at the front face thereof to visually see a battery fluid interface 34 from outside. The battery fluid detection portion 35 is marked with an upper limit scale 36a showing the upper limit of the filled amount of the battery fluid 32 and a lower limit scale 36b showing the lower limit of the filled amount of the battery fluid 32. The battery 31 is filled with the battery fluid 32 so that the battery fluid interface 34 is positioned between the upper limit scale and the lower limit scale.

The battery cover 1 is attached to the battery 31 so that the side face (front face) including the battery fluid detection portion 35 of the battery 31 faces the front wall 7 of the battery cover 1. When the battery cover 1 is attached to the battery 31, the battery fluid detection portion 35 is exposed from the upper end portion of the front wall 7 that is cut out into a generally U-shape.

As shown in FIGS. 7 and 8, the battery cover 1 is formed so that the spaces defined from the four side walls 2 (inner side face) of the battery cover 1 is slightly larger than the side faces of the battery 31.

As shown in FIG. 8, at four corners of the battery cover 1, by bending the two bending portions (left-front bending portions 9d and 9e, left-rear bending portions 10d and 10e, right-front bending portions 11d and 11e, and right-rear bending portions 12d and 12e), the outer circumferential shape of the battery cover 1 is formed into a shape having the four corners chamfered with oblique angles, that is, generally octagon when viewed from the top. Then, at the inner circumferential face of the battery cover 1, the four corner portions (particularly, four connecting walls composed of left-front thick portion 9a, left-rear thick portion 10a, right-front thick portion 11a, and right-rear thick portion 12a) are projected inward. Therefore, when the battery 31 is inserted into the battery cover 1, the four connecting walls are brought into contact with the four corners 38 (angles: 38a, 38b, 38c, 38d) of the battery side faces, thereby fixing the battery cover 1 to the battery 31.

The first spacer 3 is brought into contact with the upper portion of the side faces of the battery 31, and the second spacer 4 is brought into contact with the lower portion of the side faces of the battery 31. To be specific, the inner side face of the first spacer 3 is brought into contact with the side faces of the battery 31 entirely in the circumferential direction, and the inner side face of the second spacer 4 is brought into contact with the side faces of the battery 31 entirely in the circumferential direction.

The bottom face of the battery 31 is flush with the lower end face of the second spacer 4 and the lower end face of the side walls 2 of the battery cover 1.

Then, four enclosed spaces 37 (air layer) are defined by the inner side face of the side walls 2 of the battery cover 1, the side faces of the battery 31, the first spacer 3, the connecting walls, and the second spacer 4.

To be specific, in front of the battery 31, the first spacer 3, the left-front thick portion 9a, the right-front thick portion 11a, the second spacer 4, the front wall 7, and the front face of the battery 31 define a front space 37a. In back of the battery 31, the first spacer 3, the left-rear thick portion 10a, the right-rear thick portion 12a, the second spacer 4, the rear wall 8, and the rear side face of the battery 31 define a rear space 37b. In left of the battery 31, the first spacer 3, the left-front thick portion 9a, the left-rear thick portion 10a, the second spacer 4, the left wall 5, and the left side face of the battery 31 define a left space 37c. In right of the battery 31, the first spacer 3, the right-front thick portion 11a, the right-rear thick portion 12a, the second spacer 4, the right wall 6, and the right side face of the battery 31 define a right space 37d.

The space 37 has a distance (distance between the inner side face of the side wall 2 of the battery cover 1 and the side face of the battery 31) of, for example, 1 mm or more, preferably 3 mm or more, and for example, 15 mm or less, preferably 10 mm or less.

2-4. Folding

The battery cover 1 can be folded as shown in FIGS. 9A to 9B or FIGS. 10A to 10B.

Figure 9A:
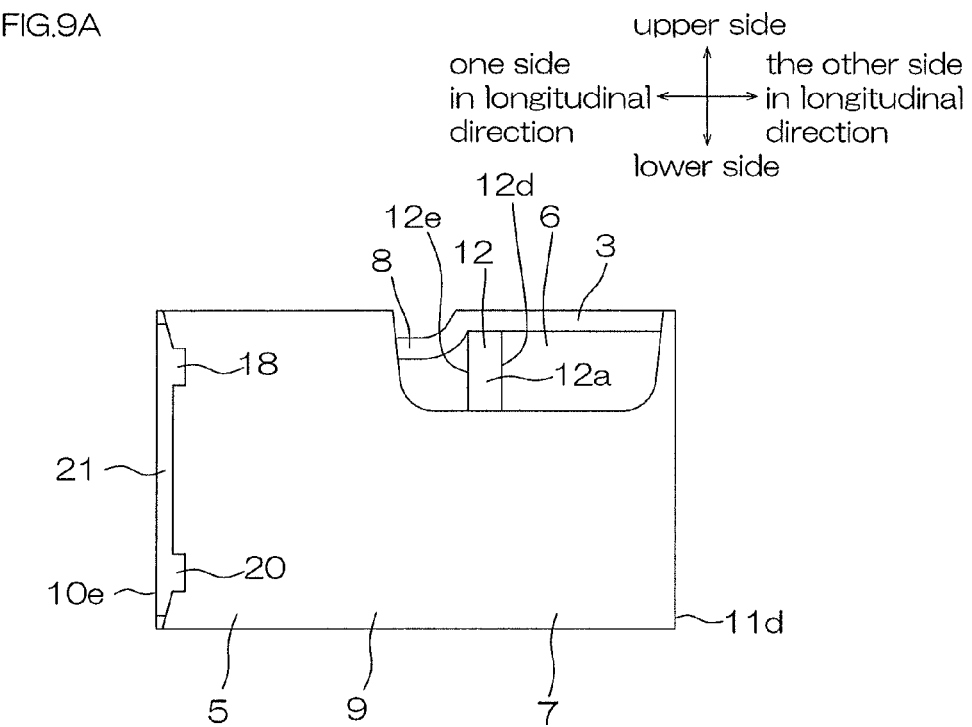
FIGS. 9A and 9B show one embodiment in which the battery cover shown in FIG. 3 is folded.
Figure 9B:
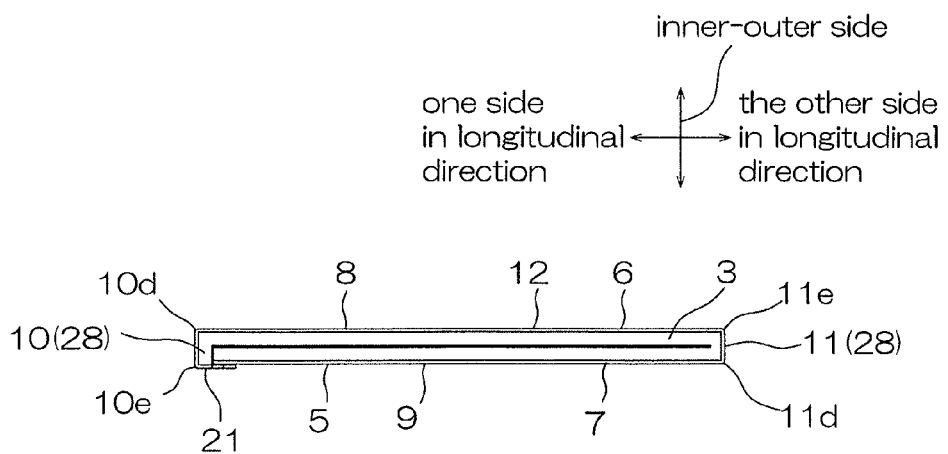

To be specific, in FIGS. 9A to 9B, by bending the right-front bending portions 11d and 11e of the right-front connecting portion 11 and the left-rear bending portions 10d and 10e of the left-rear connecting portion 10, and extending the left-front bending portions 9d and 9e of the left-front connecting portion 9 and the right-rear bending portions 12d and 12e of the right-rear connecting portion 12, the front wall 7, the left-front connecting portion 9, and the left wall 5 become continuously flat, and the rear wall 8, the right-rear connecting portion 12, and the right wall 6 become continuously flat, and they are folded so as to lie on top of one another.

At this time, at the right-front connecting portion 11, and at the front wall 7 and the right wall 6 that are connected at both sides of the right-front connecting portion 11, the first spacer 3 and the second spacer 4 are bent into a generally U-shape when viewed from the top along the two right-front bending portions 11d and 11e.

Figure 10A:
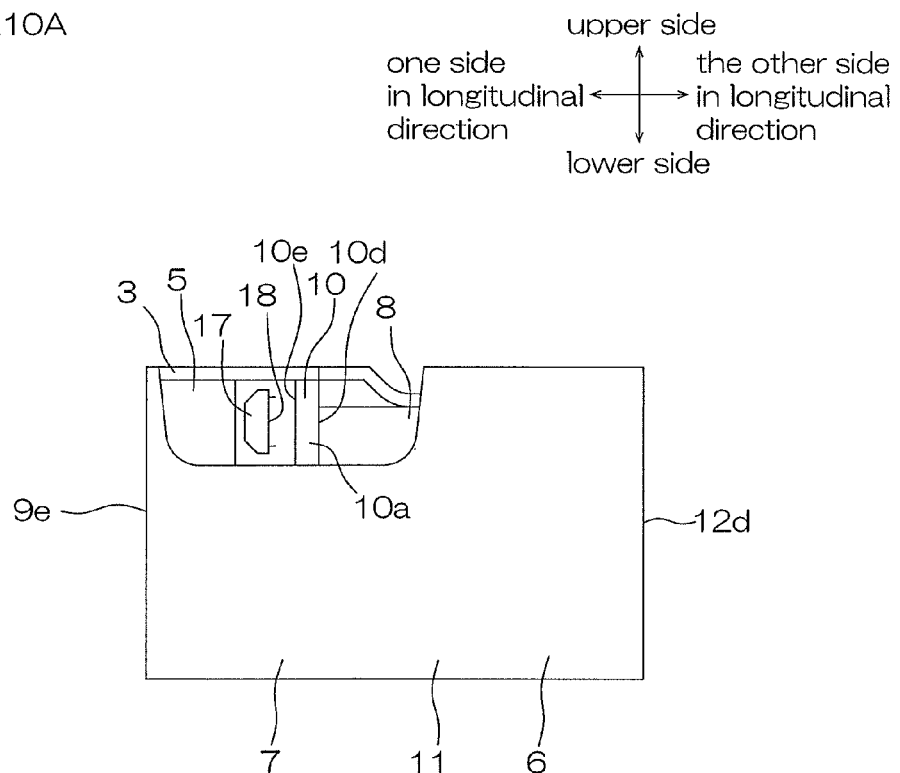
FIGS. 10A and 10B show another embodiment in which the battery cover shown in FIG. 3 is folded.
Figure 10B:
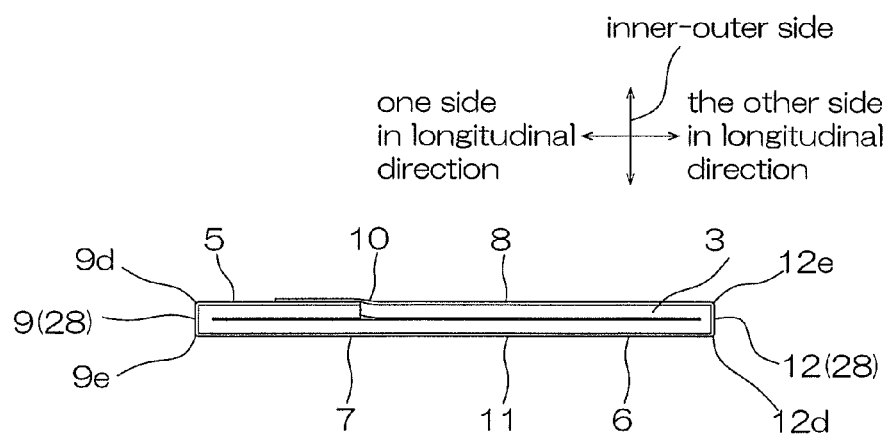

Meanwhile, in FIGS. 10A to 10B, by bending the left-front bending portions 9d and 9e of the left-front connecting portion 9 and the right-rear bending portions 12d and 12e of the right-rear connecting portion 12, and extending the right-front bending portions 11d and 11e of the right-front connecting portion 11 and the left-rear bending portions 10d and 10e of the left-rear connecting portion 10, the front wall 7, the right-front connecting portion 11, and the right wall 6 become continuously flat, and the rear wall 8, the left-rear connecting portion 10, and the left wall 5 become continuously flat, and they are folded so as to lie on top of one another.

At this time, at the left-front connecting portion 9, and at the front wall 7 and the left wall 5 that are connected at both sides of the left-front connecting portion 9, the first spacer 3 and the second spacer 4 are bent into a generally U-shape when viewed from the top along the two left-front bending portions 9d and 9e.

2-5 Function and Effect of Battery Cover

Then, in the battery cover 1, the upper end edge and the lower end edge of the side walls 2 (left wall 5, right wall 6, front wall 7, and rear wall 8) covering the four side faces of the battery 31 and the connecting portions 23 (left-front connecting portion 9, left-rear connecting portion 10, right-front connecting portion 11, and right-rear connecting portion 12) connecting the side walls 2 consist of the thin portion that is made of the high-density portion, and the thick portion that is made of the low-density portion is not disposed at the upper end edge and the lower end edge thereof. Thus, the mechanical strength at the upper end edge and the lower end edge can be improved. Therefore, even when the battery cover 1 is repeatedly attached or detached, damages to the upper end edge and the lower end edge can be suppressed and the durability is excellent.

Also, the upper end edge and the lower end edge consist of the thin portion that is made of the high-density portion, and the thickness of the thin portion is formed thinner than that of the thick portion. Thus, the entry of water from the upper end edge and the lower end edge into the battery cover 1 can be suppressed, so that the water resistance can be improved. Therefore, corrosion and a reduction in heat-insulating properties of the battery cover 1 can be suppressed.

The thin portion has density of 0.45 g/cm$^3$ or less, so that it has excellent heat-insulating properties.

The battery cover 1 includes the side walls 2 (left wall 5, right wall 6, front wall 7, and rear wall 8) covering the four side faces of the battery 31, the first spacer 3 provided at the upper portion of the side walls 2, and the second spacer 4 provided at the lower portion of the side walls 2, and therefore, the spaces 37 (air layers) are created between the side faces of the battery 31 and the side walls 2 of the battery cover 1.

Therefore, heat conducted to the side walls 2 of the battery cover 1 from outside is not directly conducted to the side faces of the battery 31 through the battery cover 1. As a result, the battery cover 1 has excellent heat-insulating properties and can protect the battery 31 from outside heat effectively.

Furthermore, in the battery cover 1, the connecting walls (left-front thick portion 9a, left-rear thick portion 10a, right-front thick portion 11a, and right-rear thick portion 12a) are provided on the side walls 2 along the up-down direction to be brought into contact with the side faces of the battery 31 along the up-down direction.

Therefore, the spaces 37 between the side walls 2 of the battery cover 1 and the side faces of the battery 31 can be kept.

To be specific, in the battery cover 1, when the battery cover 1 is attached to the battery 31, the connecting walls are provided on the side walls 2 so that the connecting walls are brought into contact with the corners 38 (38a, 38b, 38c, and 38d) of the side faces of the battery.

Therefore, the corners 38 of the side faces of the battery 31 have high strength and therefore, the battery cover 1 can be more reliably attached to the battery 31.

To be specific, the four connecting walls (left-front thick portion 9a, left-rear thick portion 10a, right-front thick portion 11a, and right-rear thick portion 12a) are provided on the side walls 2 so that the four connecting walls are brought into contact with the four corners 38 of the side faces of the battery 31.

Therefore, the connecting walls are brought into contact with the four corners 38a, 38b, 38c, and 38d of the battery 31 and therefore, the battery cover 1 can be more reliably attached to the battery 31, while keeping the spaces 37 between the side walls 2 of the battery cover 1 and the side faces of the battery 31.

That is, the battery cover 1 forms a generally octagon when viewed from the top with the side walls 2 (left wall 5, right wall 6, front wall 7, and rear wall 8) and the connecting portions 23 (left-front connecting portion 9, left-rear connecting portion 10, right-front connecting portion 11, and right-rear connecting portion 12). Therefore, spaces can be reliably formed between the side walls 2 of the battery cover 1 and the side faces of the battery 31.

Furthermore, when the battery cover 1 is attached to the battery 31, as described above, the four spaces (37a, 37b, 37c, and 37d) are defined. Therefore, the spaces 37 can be formed and saved more reliably between the battery cover 1 and the battery 31.

Furthermore, in the battery cover 1, the four folding portions 28 (left-front connecting portion 9, left-rear connecting portion 10, right-front connecting portion 11, and right-rear connecting portion 12) are provided in spaced-apart relation to each other. Therefore, the battery cover 1 can be folded so that the inner side faces of the side walls 2 are brought into contact and therefore, the battery cover 1 can be carried and stored in a compact size.

More specifically, in the battery cover 1, each of the folding portions 28 includes two bending portions (left-front bending portions 9d and 9e, left-rear bending portions 10d and 10e, right-front bending portions 11d and 11e, and right-rear bending portions 12d and 12e). Therefore, two angles can be formed at each of the corners of the battery cover 1 when the battery cover 1 is prismatic upon attaching the battery cover 1 to the battery 31. Therefore, the battery cover 1 can be formed into a generally octagon when viewed from the top as described above, and spaces can be reliably formed between the side walls 2 of the battery cover 1 and the side faces of the battery 31.

Furthermore, when the battery cover 1 is folded, the side walls 2 facing each other can keep a predetermined distance at the folding portions 28 and therefore, stress caused by contacts between the first spacers 3 provided at the inner side face of the side walls 2 can be eased. As a result, damages to the first spacer 3 can be reduced when the battery cover 1 is folded and stored.

Furthermore, in the battery cover 1, the side walls 2 are formed from the low-density portion and include the foam portion 106, so that the heat-insulating properties of the battery cover 1 further improve. Therefore, protection of the battery 31 from heat can be reliably achieved.

To be specific, the side walls 2 include the foam portion 106 and the two air barrier layers 105 (105a and 105b) laminated on both faces of the foam portion 106 and therefore, the heat-insulating properties of the battery cover 1 further improve. Therefore, protection of the battery 31 from heat can be reliably achieved.

3-1. Shielding Member

Figure 11A:
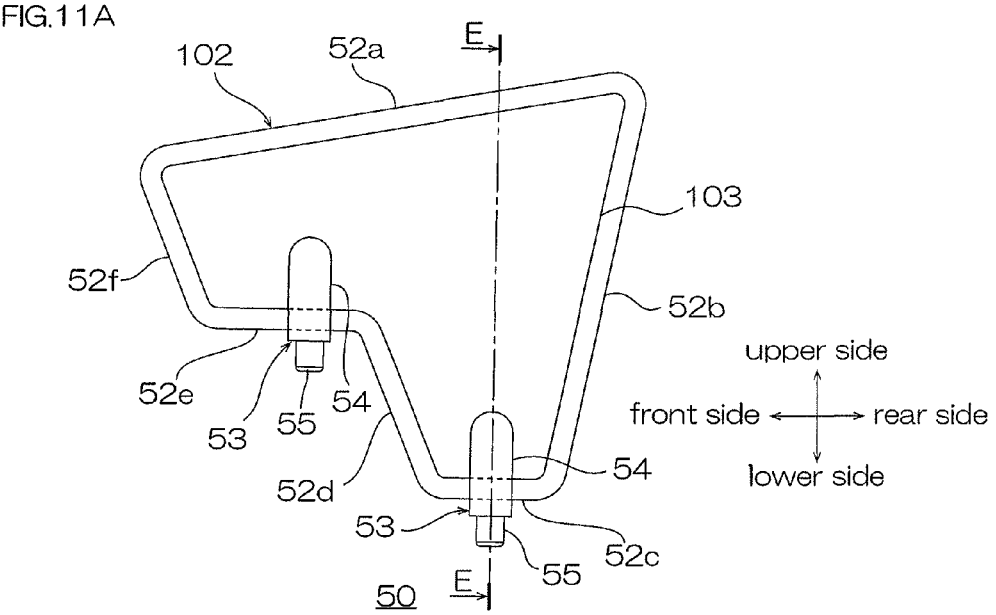
FIGS. 11A and 11B show one embodiment of a shielding member of the present invention.

The directions in FIG. 11A are as follows: upper side on the plane of the sheet is upper side (one side in a first direction), lower side on the plane of the sheet is lower side (the other side in the first direction), left side on the plane of the sheet is front side (one side in a second direction), right side on the plane of the sheet is rear side (the other side in the second direction), front side on the plane of the sheet is left side (one side in a third direction), and far side on the plane of the sheet is right side (the other side in the third direction). The directions in FIGS. 11B and 12 are also in conformity with the directions shown in FIG. 11A.

Figure 11B:
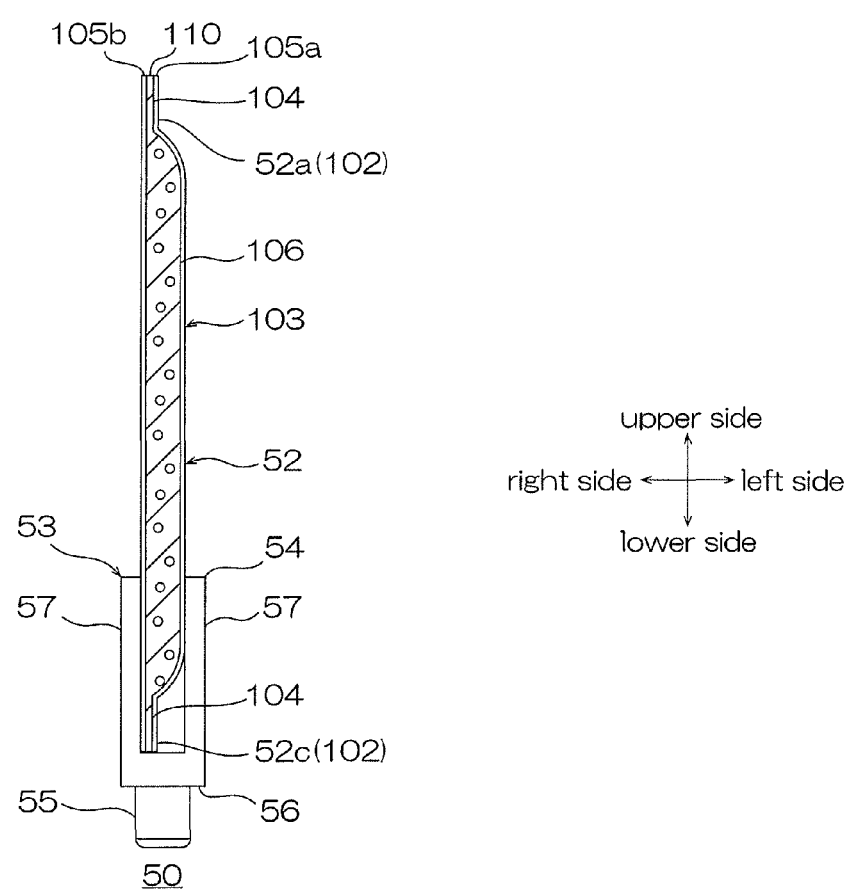

As shown in FIGS. 11A and 11B, a shielding member 50 includes a shielding plate 51 and a clip 53 attached to the shielding plate 51.

The shielding plate 51 is formed into a generally flat plate shape. The shielding plate 51 is formed into a predetermined shape corresponding to the cross-sectional shape of a space of a structure member to be described later and is, for example, formed into a generally L-shape.

The shielding plate 51 is formed of the wall member 101 of the heat insulating member 100 described above, and includes the high-density portion 102 provided at the circumferential end edge of the shielding plate 51 and the low-density portion 103 provided at the inner side of the high-density portion 102.

The high-density portion 102 includes an upper-end high-density portion 52a, a rear-end high-density portion 52b extending from the rear end of the upper-end high-density portion 52a toward the lower side, a first lower-end high-density portion 52c continuously extending from the lower end of the rear-end high-density portion 52b toward the front side, a first front-end high-density portion 52d extending from the front end of the first lower-end high-density portion 52c toward the upper side, a second rear-end high-density portion 52e extending from the upper end of the first front-end high-density portion 52d toward the front side, and a second front-end high-density portion 52f extending from the front end of the second rear-end high-density portion 52e toward the upper side.

The upper-end high-density portion 52a is provided over the entire upper end edge of the shielding plate 51. That is, the upper-end high-density portion 52a is provided continuously from the upper end of the rear-end high-density portion 52b over the upper end of the second front-end high-density portion 52f.

The rear-end high-density portion 52b is provided over the entire rear end edge of the shielding plate 51. That is, the rear-end high-density portion 52b is provided continuously from the rear end of the upper-end high-density portion 52a over the rear end of the first lower-end high-density portion 52c.

The first lower-end high-density portion 52c is provided over the entire rear end edge in the rear side portion of the shielding plate 51. That is, the first lower-end high-density portion 52c is provided continuously from the lower end of the rear-end high-density portion 52b over the lower end of the first front-end high-density portion 52d.

The first front-end high-density portion 52d is provided over the entire front end edge in the rear and lower side portion of the shielding plate 51. That is, the first front-end high-density portion 52d is provided continuously from the front end of the first lower-end high-density portion 52c over the rear end of the second rear-end high-density portion 52e.

The second rear-end high-density portion 52e is provided over the entire lower end edge in the front side portion of the shielding plate 51. That is, the second rear-end high-density portion 52e is provided continuously from the upper end of the first front-end high-density portion 52d over the lower end of the second front-end high-density portion 52f.

The second front-end high-density portion 52f is provided over the entire front end edge in the front side portion of the shielding plate 51. That is, the second front-end high-density portion 52f is provided continuously from the front end of the second rear-end high-density portion 52e over the front end of the upper-end high-density portion 52a.

The low-density portion 103 is provided so as to be surrounded by the high-density portion 102 (upper-end high-density portion 52a, rear-end high-density portion 52b, first lower-end high-density portion 52c, first front-end high-density portion 52d, second rear-end high-density portion 52e, and second front-end high-density portion 52f).

The clip 53 is, for example, formed of a hard synthetic resin molded article or the like, and integrally includes a pinching portion 54 sandwiching the shielding plate 51 in the right-left direction and a fixing portion 55 for being fixed to a space of the structure member. Each one of the clips 53 is disposed below the front side and the rear side of the shielding plate 51.

The pinching portion 54 integrally includes a bottom portion 56 in a generally rectangular shape when viewed from the top and two pinching pieces 57 extending from both end edges in the right-left direction of the bottom portion 56 upwardly.

The fixing portion 55 is formed into a generally column shape so as to project from the lower end face of the bottom portion 56 downwardly.

The shielding member 50 is, for example, used as a division of a space of the structure member. Examples of the structure member include engine portions of vehicles.

3-2. Usage of Shielding Member

One embodiment of a method in which the shielding member 50 is used in an engine portion is described with reference to FIG. 12.

As shown in FIG. 12, a vehicle 60 includes an engine portion 61 and a windshield 62.

The engine portion 61 includes an engine room 63 and a cowl 64.

The engine room 63 includes, for example, an engine and a battery that are not shown at the inside thereof.

The cowl 64 is provided between the engine room 63 and the windshield 62. The cowl 64 is disposed along the right-left direction of the vehicle 60 and includes a cowl frame 65 that dents downwardly. The cowl frame 65 integrally includes an engine room-side ditch portion 65a that is formed at the front side and a vehicle interior-side ditch portion 65b that allows for communication with the rear side of the engine room-side ditch portion 65a and is formed more deeply. A cowl space 66 is defined by the engine room-side ditch portion 65a and the vehicle interior-side ditch portion 65b. Also, an outside air inlet 67 for introducing the outside air into the vehicle interior is formed at the rear wall of the vehicle interior-side ditch portion 65b. A fixing portion insertion hole (not shown) is formed in a position corresponding to each of the clips 53 disposed at the front side and the rear side of the shielding member 50 at the bottom wall of the engine room-side ditch portion 65a and the vehicle interior-side ditch portion 65b.

The shielding members 50 are disposed in the cowl space 66 so as to be disposed at both outer sides in the right-left direction of the outside air inlet 67.

To dispose the shielding members 50 in the cowl space 66, until the lower end face of the bottom portion 56 is brought into contact with the bottom face of the cowl frame 65, each of the fixing portions 55 of the clips 53 at the front side and the rear side is inserted from above and fixed to the corresponding fixing portion insertion hole of the engine room-side ditch portion 65a and the vehicle interior-side ditch portion 65b so that the high-density portion 102 is brought into tight contact with the inner circumferential face of the cowl frame 65.

In this manner, in the cowl space 66, a portion in which the outside air inlet 67 is formed is shielded, and the entry of hot air and odor from the engine room into the vehicle interior through the outside air inlet 67 can be prevented.

The shielding member 50 can achieve the same function and effect as that of the heat insulating member 100 in FIG. 1.

EXAMPLES

The present invention will hereinafter be described based on Examples and Comparative Examples below. The present invention is however not limited by the following Examples and Comparative Examples. The specific numerical values in mixing ratio (content ratio), property value, and parameter used in the following description will be replaced with upper limits (numerical values defined as "or less" or "below") or lower limits (numerical values defined as "or more" or "above") of corresponding numerical values in mixing ratio (content ratio), property value, and parameter described in the above-described "DESCRIPTION OF EMBODIMENTS".

Example 1

Two polyester nonwoven fabrics impregnated with resorcin (PET fiber, weight per unit area of 80 g/m$^2$, thickness of 0.25 mm) as an air barrier layer, urethane foam in a flat plate shape (density of 0.017 g/cm$^3$, thickness of 15 mm), and a powdered hot melt adhesive were prepared. Next, the hot melt adhesive adhered to one face and the other face of the urethane foam so as to be scattered and furthermore, the polyester nonwoven fabric was laminated thereon, thereby producing a laminate.

The laminate was pressed at 185° C. for 50 seconds using a heating plate by appropriately adjusting the pressure of pressing the central portion and the circumferential end edge so that the low-density portion (thick portion, thickness of 15.0 mm) was formed at the central portion of the laminate and the high-density portion (thin portion, thickness of 2.0 mm, length in the up-down direction of 10 mm) was formed over the entire circumferential end edge of the laminate. Next, by trimming the laminate, a wall member shown in FIG. 1 was produced.

The results of the thickness, the density, or the like of the central portion (low-density portion) and the circumferential end edge (high-density portion) at this time are shown in Table 1.

Example 2

A wall member was produced in the same manner as that in Example 1, except that urethane foam (open-cell ratio of 100%, thickness of 20.0 mm) was used instead of the urethane foam (open-cell ratio of 100%, thickness of 15.0 mm). The results are shown in Table 1.

Example 3

A wall member was produced in the same manner as that in Example 1, except that as an air barrier layer, a mixed nonwoven fabric impregnated with resorcin (mixed nonwoven fabric of PET and rayon, weight per unit area of 80 g/m$^2$, thickness of 0.25 mm) was used instead of the polyester nonwoven fabric impregnated with resorcin (PET fiber, weight per unit area of 80 g/m$^2$, thickness of 0.25 mm). The results are shown in Table 1.

Example 4

A wall member was produced in the same manner as that in Example 3, except that urethane foam (density of 0.017 g/cm$^3$, thickness of 20.0 mm) was used instead of the urethane foam (density of 0.017 g/cm³, thickness of 15.0 mm). The results are shown in Table 1.

Example 5

A wall member was produced in the same manner as that in Example 1, except that as an air barrier layer, a mixed nonwoven fabric impregnated with resorcin (mixed nonwoven fabric of PET and rayon, weight per unit area of 100 g/m², thickness of 0.25 mm) was used instead of the polyester nonwoven fabric impregnated with resorcin (PET fiber, weight per unit area of 80 g/m², thickness of 0.25 mm).

Example 6

A wall member was produced in the same manner as that in Example 5, except that urethane foam (density of 0.017 g/cm³, thickness of 20.0 mm) was used instead of the urethane foam (density of 0.017 g/cm³, thickness of 15.0 mm). The results are shown in Table 1.

Examples 7 to 10

Wall members were produced in the same manner as that in Example 1, except that the thickness of the central portions was changed to those shown in Table 1. The results are shown in Table 1.

Comparative Examples 1 to 2

Wall members were produced in the same manner as that in Example 1, except that the thickness and the density of the central portions and the circumferential end portions were changed to those shown in Table 1. The results are shown in Table 1.

Comparative Example 3

A wall member was produced in the same manner as that in Example 1, except that the air barrier layer was not laminated and the thickness and the density were changed to those shown in Table 1. The results are shown in Table 1.

(Heat-Insulating Properties Test)

Each of the wall members in Examples and Comparative Examples was cut into a size of 200 mm×200 mm to be disposed at a position 20 mm away from a heat source. Next, the heat source was set at a predetermined temperature and left to stand for 60 minutes.

At the central portion of the wall member, the temperature of the heat source-side face and the face opposite to the heat source-side face was measured, and a difference in temperature was calculated.

The predetermined temperature of the heat source was set to 55° C., 65° C., 75° C., 85° C., and 95° C. The results are shown in Table 1.

(Chemical Resistance)

About 0.5 ml of dilute sulfuric acid (concentration of 37%) was added dropwise to the face at the central portion of each of the wall members of Examples and Comparative Examples, and its face was lightly wiped off to be then left to stand for 12 hours under the environment of 100° C.

Thereafter, the state of the face was visually checked, and a case where change was not confirmed was evaluated as "Good" and a case where dissolution of the face was confirmed was evaluated as "Bad". The results are shown in Table 1.

(Mechanical Strength)

Each of the wall members in Examples and Comparative Examples was disposed along the vertical direction, and the upper end edge of the side wall was strongly pressed from the upper side downwardly with hands.

A case where deformation was not confirmed in the end edges (upper end edge and lower end edge) of the side wall was evaluated as "Good" and a case where deformation of the end edges was greatly confirmed was evaluated as "Bad". The results are shown in Table 1.

(Water Resistance)

The upper end edge of each of the wall members in Examples and Comparative Examples was soaked in water for one second, and the state thereof was checked.

A case where change in the thickness of the upper end edge was not confirmed was evaluated as "Good" and a case where the thickness of the upper end edge expanded was evaluated as "Bad". The results are shown in Table 1.

TABLE 1

| | | | Ex. 1 | Ex. 2 | Ex. 3 | Ex. 4 | Ex. 5 |
|---|---|---|---|---|---|---|---|
| Air Barrier Layer | | Nonwoven Fabric | PET | PET | PET/Rayon | PET/Rayon | PET/Rayon |
| | | Weight per unit area (g/m²) | 80 | 80 | 80 | 80 | 100 |
| Central Portion | Foam (Foam Portion) | Original Thickness (mm) | 15.0 | 20.0 | 15.0 | 20.0 | 15.0 |
| | | Compression Ratio (%) | 37 | 53 | 37 | 53 | 37 |
| | | Thickness after Compression (mm) | 9.5 | 9.5 | 9.5 | 9.5 | 9.5 |
| | Thickness of Central Portion after Compression (mm) | | 10.0 | 10.0 | 10.0 | 10.0 | 10.0 |
| | Density of Central Portion after Compression (g/cm³) | | 0.046 | 0.061 | 0.044 | 0.059 | 0.048 |
| Circumferential End Edge | Foam (Compressed Portion) | Original Thickness (mm) | 15.0 | 20.0 | 15.0 | 20.0 | 15.0 |
| | | Compression Ratio (%) | 97 | 98 | 97 | 98 | 97 |
| | | Thickness after Compression (mm) | 0.5 | 0.5 | 0.5 | 0.5 | 0.5 |
| | Thickness of Circumferential End Edge after Compression (mm) | | 1.0 | 1.0 | 1.0 | 1.0 | 1.0 |
| | Density of Circumferential End Edge after Compression (g/cm³) | | 0.460 | 0.460 | 0.460 | 0.460 | 0.460 |
| Evaluation | Heat Insulating Properties (° C.) | Heat Source of 55° C. | 10.9 | 10.3 | 9.1 | 10.4 | 10.1 |
| | | Heat Source of 65° C. | 11.9 | 11.3 | 12.0 | 12.1 | 10.4 |
| | | Heat Source of 75° C. | 19.7 | 17.7 | 15.1 | 14.6 | 16.2 |
| | | Heat Source of 85° C. | 20.2 | 22.8 | 20.0 | 22.2 | 18.1 |
| | | Heat Source of 95° C. | 20.5 | 27.9 | 24.3 | 25.8 | 26.3 |
| | | Average | 16.6 | 18.0 | 16.1 | 17.0 | 16.2 |

TABLE 1-continued

|  |  |  |  |  |  |  |  |
|---|---|---|---|---|---|---|---|
|  | Chemical Resistance | Good | Good | Good | Good | Good |
|  | Mechanical Strength | Good | Good | Good | Good | Good |
|  | Water Resistance | Good | Good | Good | Good | Good |

|  |  |  | Ex. 6 | Ex. 7 | Ex. 8 | Ex. 9 | Ex. 10 | Comp. Ex. 1 |
|---|---|---|---|---|---|---|---|---|
| Air Barrier Layer |  | Nonwoven Fabric | PET/Rayon | PET | PET | PET | PET | PET |
|  |  | Weight per unit area (g/m²) | 100 | 80 | 80 | 80 | 80 | 80 |
| Central Portion | Foam (Foam Portion) | Original Thickness (mm) | 20.0 | 15.0 | 15.0 | 15.0 | 15.0 | 15.0 |
|  |  | Compression Ratio (%) | 53 | 23 | 57 | 70 | 83 | 97 |
|  |  | Thickness after Compression (mm) | 9.5 | 11.5 | 6.5 | 4.5 | 2.5 | 0.5 |
|  | Thickness of Central Portion after Compression (mm) |  | 10.0 | 12.0 | 7.0 | 5.0 | 3.0 | 1.0 |
|  | Density of Central Portion after Compression (g/cm³) |  | 0.063 | 0.038 | 0.066 | 0.092 | 0.153 | 0.460 |
| Circumferential End Edge | Foam (Compressed Portion) | Original Thickness (mm) | 20.0 | 15.0 | 15.0 | 15.0 | 15.0 | 15.0 |
|  |  | Compression Ratio (%) | 98 | 97 | 97 | 97 | 97 | 97 |
|  |  | Thickness after Compression (mm) | 0.5 | 0.5 | 0.5 | 0.5 | 0.5 | 0.5 |
|  | Thickness of Circumferential End Edge after Compression (mm) |  | 1.0 | 1.0 | 1.0 | 1.0 | 1.0 | 1.0 |
|  | Density of Circumferential End Edge after Compression (g/cm³) |  | 0.460 | 0.460 | 0.460 | 0.460 | 0.460 | 0.460 |
| Evaluation | Heat Insulating Properties (° C.) | Heat Source of 55° C. | 9.9 | 12.0 | 9.1 | 7.7 | 6.1 | 4.4 |
|  |  | Heat Source of 65° C. | 11.9 | 13.5 | — | 9.1 | — | 4.8 |
|  |  | Heat Source of 75° C. | 14.5 | 20.9 | 15.3 | 12.5 | 10.8 | 5.9 |
|  |  | Heat Source of 85° C. | 22.9 | 21.4 | — | 16.6 | — | 11.0 |
|  |  | Heat Source of 95° C. | 26.8 | 23.5 | 19.6 | 18.3 | 14.3 | 13.4 |
|  |  | Average | 17.2 | 18.3 | 14.7 | 12.8 | 10.4 | 7.9 |
|  | Chemical Resistance |  | Good | Good | Good | Good | Good | Good |
|  | Mechanical Strength |  | Good | Good | Good | Good | Good | Good |
|  | Water Resistance |  | Good | Good | Good | Good | Good | Good |

|  |  |  |  | Comp. Ex. 2 | Comp. Ex. 3 |
|---|---|---|---|---|---|
| Air Barrier Layer |  | Nonwoven Fabric |  | PET | — |
|  |  | Weight per unit area (g/m²) |  | 80 | — |
| Central Portion | Foam (Foam Portion) | Original Thickness (mm) |  | 15.0 | 15.0 |
|  |  | Compression Ratio (%) |  | 37 | 0 |
|  |  | Thickness after Compression (mm) |  | 9.5 | 15.0 |
|  | Thickness of Central Portion after Compression (mm) |  |  | 10.0 | 15.0 |
|  | Density of Central Portion after Compression (g/cm³) |  |  | 0.046 | 0.017 |
| Circumferential End Edge | Foam (Compressed Portion) | Original Thickness (mm) |  | 15.0 | 15.0 |
|  |  | Compression Ratio (%) |  | 37 | 0 |
|  |  | Thickness after Compression (mm) |  | 9.5 | 15.0 |
|  | Thickness of Circumferential End Edge after Compression (mm) |  |  | 10.0 | 15.0 |
|  | Density of Circumferential End Edge after Compression (g/cm³) |  |  | 0.046 | 0.017 |
| Evaluation | Heat Insulating Properties (° C.) | Heat Source of 55° C. |  | 10.9 | 11.1 |
|  |  | Heat Source of 65° C. |  | 11.9 | 13.6 |
|  |  | Heat Source of 75° C. |  | 19.7 | 16.5 |
|  |  | Heat Source of 85° C. |  | 20.2 | 19.6 |
|  |  | Heat Source of 95° C. |  | 20.5 | 23.2 |
|  |  | Average |  | 16.6 | 16.8 |
|  | Chemical Resistance |  |  | Good | Bad |
|  | Mechanical Strength |  |  | Bad | Bad |
|  | Water Resistance |  |  | Bad | Bad |

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The heat insulating member and the battery cover can be, for example, used in various industrial products such as vehicles, electrical products, and precision instruments requiring heat-insulating properties. The heat insulating member and the battery cover, in particular, are preferably used as a heat insulating member of engine portions of vehicles.

DESCRIPTION OF THE REFERENCE NUMERALS 1 battery cover
2 side wall
3 first spacer
5 left wall
6 right wall
7 front wall
8 rear wall
9 left-front connecting portion
10 left-rear connecting portion
11 right-front connecting portion
12 right-rear connecting portion
31 battery
37 space
50 shielding member
51 shielding plate
100 heat insulating member
101 wall member
102 high-density portion
103 low-density portion
104 compressed portion
105a first air barrier layer
105b second air barrier layer
106 foam portion 110 foam sheet
112 adhesive

The invention claimed is:

1. A heat insulating member comprising a wall member, wherein
the wall member includes
a high-density portion provided at one end edge in a direction orthogonal to a thickness direction of the wall member and having density of above 0.45 g/cm³ and
a low-density portion provided midway in the direction orthogonal to the thickness direction, having heat-insulating properties, and having density of 0.45 g/cm³ or less, and
the high-density portion is provided over the entire one end edge and
the thickness of the high-density portion is thinner than that of the low-density portion.

2. The heat insulating member according to claim 1, wherein
the high-density portion includes a compressed portion and an air barrier layer provided on at least one side face in a thickness direction of the compressed portion and
the low-density portion includes a foam portion and an air barrier layer provided on at least one side face in a thickness direction of the foam portion.

3. The heat insulating member according to claim 2, wherein the air barrier layer is a resin-impregnated nonwoven fabric including a nonwoven fabric and a resin impregnated into the nonwoven fabric.

4. The heat insulating member according to claim 3, wherein the compressed portion is impregnated with the resin.

5. The heat insulating member according to claim 2, wherein an adhesive is provided between the compressed portion and the foam portion, and the air barrier layer.

6. The heat insulating member according to claim 2, wherein the compressed portion is a compressed body obtained by compressing foam and the foam portion is the foam.

7. A battery cover comprising:
side walls covering four side faces of a battery, wherein at least one side wall is the wall member described in claim 1.

8. The battery cover according to claim 7 further including a spacer provided at the high-density portion for providing a space between the battery and the side walls.

* * * * *